(12) United States Patent
Nojima et al.

(10) Patent No.: US 8,306,867 B2
(45) Date of Patent: Nov. 6, 2012

(54) REPRODUCING APPARATUS, PORTABLE COMMUNICATION APPARATUS, ADMINISTRATIVE SERVER, AND CONTENT DISTRIBUTION SYSTEM

(75) Inventors: Mitsunori Nojima, Osaka (JP); Yohei Iwami, Osaka (JP); Minehiro Konya, Osaka (JP); Azusa Umemoto, Osaka (JP); Katsuo Doi, Osaka (JP); Masafumi Takahashi, Osaka (JP); Kumiko Yamaguchi, Koriyama (JP); Masaharu Nakatsuchi, Yokohama (JP)

(73) Assignees: Sharp Kabushiki Kaisha, Osaka (JP); NTT DoCoMo, Inc., Tokyo (JP)

( * ) Notice: Subject to any disclaimer, the term of this patent is extended or adjusted under 35 U.S.C. 154(b) by 232 days.

(21) Appl. No.: 12/738,940

(22) PCT Filed: Oct. 21, 2008

(86) PCT No.: PCT/JP2008/069060
§ 371 (c)(1),
(2), (4) Date: Apr. 20, 2010

(87) PCT Pub. No.: WO2009/054384
PCT Pub. Date: Apr. 30, 2009

(65) Prior Publication Data
US 2010/0211475 A1 Aug. 19, 2010

(30) Foreign Application Priority Data
Oct. 22, 2007 (JP) ................................ 2007-274483

(51) Int. Cl.
*G06Q 30/00* (2006.01)
(52) U.S. Cl. ...... 705/26.1; 705/26.61; 726/26; 380/247; 380/255

(58) Field of Classification Search ........ 705/26.1–27.2, 705/51–59; 726/26; 380/200–242, 247–250, 380/255–276
See application file for complete search history.

(56) References Cited

U.S. PATENT DOCUMENTS
7,099,490 B1 8/2006 Fujita et al.
(Continued)

FOREIGN PATENT DOCUMENTS
JP 2000-172638 A 6/2000
(Continued)

OTHER PUBLICATIONS
Briefing—Asia Telecommunications—Jan. 23, 2006. AsiaPulse News , p. NA.*

*Primary Examiner* — William Allen
(74) *Attorney, Agent, or Firm* — Birch, Stewart, Kolasch & Birch, LLP

(57) ABSTRACT

A reproducing apparatus (2) of the present invention receives information of a WEB site from a service-providing server (3) that administrates the WEB site, and reproduces the information. The service-providing server (3) holds identification information (40) of a user of a portable communication apparatus (1) that is permitted to access the WEB site. The reproducing apparatus (2) includes: a data receiving section for receiving, from the portable communication apparatus (1), invitation information (51), identification information (40), and transmission time point information (50); a reproducing apparatus infrared communication section; a destination determination section that establishes a connection to the service-providing server (3) based on the received invitation information (51), and transmits the invitation information (51), the identification information (40), and transmission-instruction time (50); and a reproducing apparatus communication control section. This allows the administrative server to confirm an authorized destination, based on the content request information received from the portable communication apparatus, when a content is provided from the administrative server managing the content.

3 Claims, 20 Drawing Sheets

U.S. PATENT DOCUMENTS

| | | |
|---|---|---|
| 7,343,559 B1 | 3/2008 | Fujita et al. |
| 2004/0172561 A1 | 9/2004 | Iga |
| 2006/0078160 A1 | 4/2006 | Fujita et al. |
| 2006/0156016 A1 | 7/2006 | Tanaka |
| 2009/0270124 A1 | 10/2009 | Yamada et al. |
| 2009/0281950 A1 | 11/2009 | Iga |
| 2009/0282490 A1 | 11/2009 | Iga |

FOREIGN PATENT DOCUMENTS

| | | |
|---|---|---|
| JP | 2002-230437 A | 8/2002 |
| JP | 2002-230438 A | 8/2002 |
| JP | 2002-230447 A | 8/2002 |
| JP | 2002-366442 A | 12/2002 |
| JP | 3522635 B2 | 4/2004 |
| JP | 2004-264902 A | 9/2004 |
| JP | 2004-265139 A | 9/2004 |
| JP | 2004-334627 A | 11/2004 |
| JP | 2006-209413 A | 8/2006 |
| JP | 2007-213467 A | 8/2007 |
| JP | 2007-274216 A | 10/2007 |
| WO | WO 2006/109613 A1 | 10/2006 |

* cited by examiner

F I G. 8
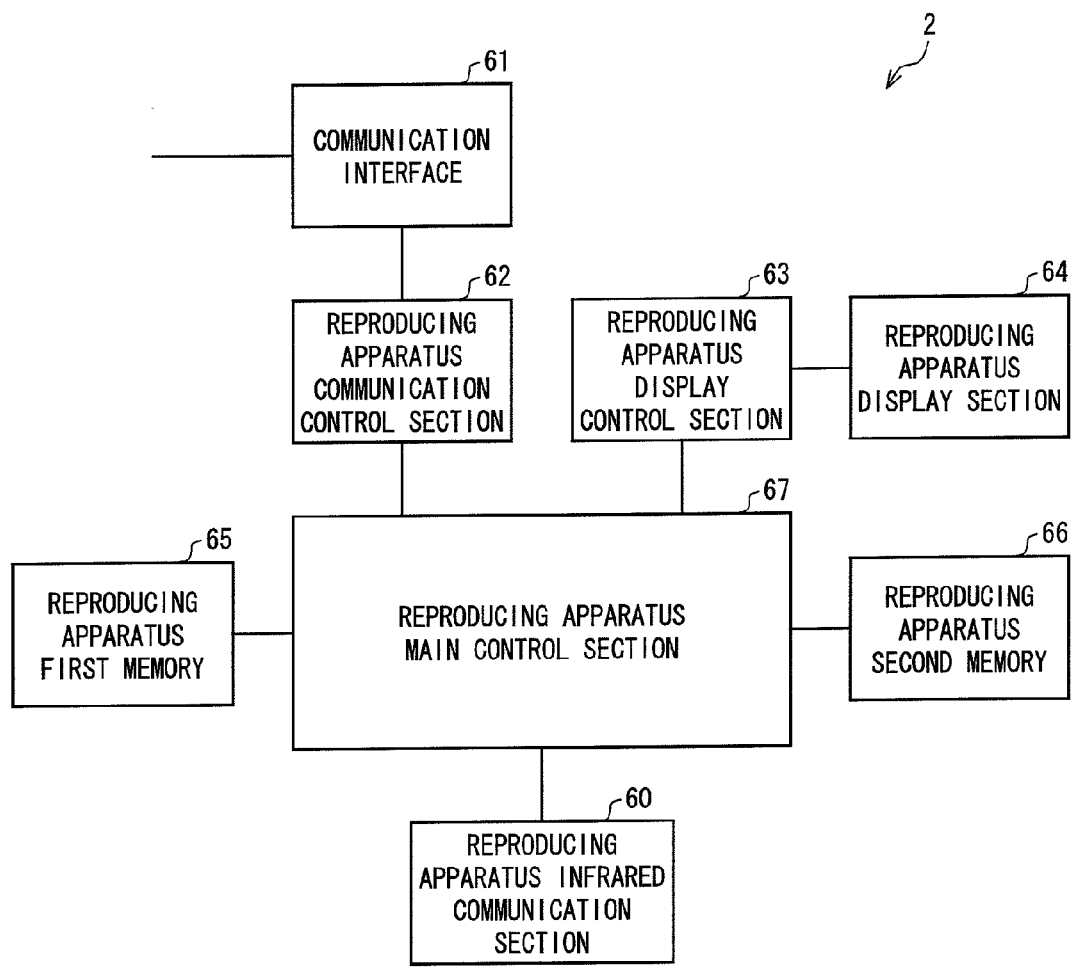

F I G. 1 1

| SERVICE ID | URL |
|---|---|
| 123212 | http://www.xxx.vvv/?id=1digho&··· |
| ... | ... |

55

F I G. 1 2

| IDENTIFICATION INFORMATION | MAIL ADDRESS | OWNER NAME | ADDRESS | TELEPHONE NUMBER | INVITATION TRANSMISSION HISTORY |
|---|---|---|---|---|---|
| 123212 | Keitai@abc.ne.jp | A | A CITY | 090-1234-5678 | NO HISTORY |
| 987898 | Keitai@def.ne.jp | B | B CITY | 090-5678-1234 | SERVICE ID:2007/8/10 3:30 |
| ... | ... | ... | ... | ... | ... |

REPRODUCING APPARATUS, PORTABLE COMMUNICATION APPARATUS, ADMINISTRATIVE SERVER, AND CONTENT DISTRIBUTION SYSTEM

TECHNICAL FIELD

The present invention relates to a system in which in response to a content transmission request that is transmitted from a portable communication apparatus to an administrative server via a reproducing apparatus, a content is supplied from the administrative server.

BACKGROUND ART

As mobile phone devices equipped with a digital camera have been widely used recently, there are more opportunities to use image data. For example, image data is acquired by use of such a mobile phone device and displayed on a display device, or thus obtained image data is printed out by a printer. As such, the image data has been widely used in various ways.

Further, a notification service of a URL (Uniform Resource Locator) with the use of a two-dimensional code, such as QR code (registered trademark), and the like services have been offered. More specifically, image data of a QR code is read by a camera function of the mobile phone device, and then the image data is analyzed whereby information of a URL or the like that is embedded into the QR code can be obtained. Moreover, there has been also studied and developed such a technique that data, such as URL, is embedded into an image so that information can be obtained from image data of the image.

Moreover, there have been widely used techniques of transferring image data via wireless communication between apparatuses. For example, as a protocol for transferring image data via wireless communication, a high-speed infrared communication protocol (i.e., IrSimple (registered trademark)), a short distance wireless communication protocol (i.e., Bluetooth (registered trademark)), and the like techniques are used. Furthermore, short distance data communication using infrared radiation, such as IrDA, is also used. With the use of these communication protocols, it is possible to easily transmit, to a display device, image data obtained by a mobile phone device or image data including information of a URL or the like.

Further, along with the wide use of mobile phone devices, there have been increased such opportunities that for using a content of video data, image data, or the like, the content is received from a server that administrates the content. The server performs an authentication process with respect to a user of a mobile phone device at the time of distributing a content so that the content can be distributed only to the mobile phone device of the user who is permitted to use the content. Then, the server distributes the content only to the mobile phone device of the user who is authenticated.

In the meantime, the authentication process requires transmission of personal information of the user and the like information that the user does not want to disclose to other people, from the mobile phone device to the server. However, there is such a risk that the personal information and the like information may be eavesdropped at the time of transmission from the mobile phone device to the server. One of effective ways to prevent such a risk is encryption of information to be transmitted.

As a technique related to encryption of information and decryption of encrypted information, Patent Literature 1 (Japanese Patent Application Publication, Tokukai, No. 2002-366442 (Publication Date: Dec. 20, 2002)) discloses a data terminal device. More specifically, Patent Literature 1 discloses a data terminal device that obtains, from a data recording device, encrypted content data and a license including a license key for decrypting the encrypted content data, so that the data terminal device decrypts the encrypted content data and reproduces the content data thus decrypted.

The data terminal device is arranged such that the data terminal device transmits, to the data recording device, a function certificate that ensures a reproduction function of a content, and then receives encrypted content data and a license from the data recording device when the function ensured by the function certificate conforms to reproduction control information included in the license. The arrangement allows the data recording device that manages a license key to check a reproduction limit of the data terminal device upon content data.

However, the above conventional arrangement causes the following problem. That is, in a case where a reproducing apparatus receives content request information from a portable communication apparatus and requests, in response to that, an administrative server that administrates a content, to provide the content to the reproducing apparatus, the administrative server cannot check whether or not the reproducing apparatus is an authentic destination to which the content is to be transmitted.

For example, in a case where a content of image data received from a certain WEB site or the like is displayed on a portable communication apparatus, visibility of an image displayed on a display screen of the portable communication apparatus may be poor because the display screen is small. In this case, such a system may be possible that the image data of the WEB site is transmitted to a reproducing apparatus having a display screen larger than that of the portable communication apparatus so that the image data is displayed on the display screen of the reproducing apparatus.

In the meantime, as described above, a content to be distributed from a certain WEB site is provided only to an apparatus belonging to a user that is permitted to use the content. At this time, data necessary for an authentication process is exchanged between an administrative server of the WEB site and the apparatus that requests the content. However, a reproducing apparatus, such as a television, cannot exchange such data necessary for the authentication process with the administrative server. As a result, the reproducing apparatus cannot receive the content directly from the administrative server.

SUMMARY OF INVENTION

The present invention is accomplished in view of the above problem. An object of the present invention is to realize a reproducing apparatus, a portable communication apparatus, an administrative server, and a content distribution system each of which allows an administrative server that administrates a content, to check whether or not a reproducing apparatus is an authentic destination to which the content is to be transmitted, in a case where, in response to content request information from a portable communication apparatus, the reproducing apparatus reproduces the content by receiving the content from the administrative server that distributes the content.

In order to achieve the above object, a reproducing apparatus of the present invention is a reproducing apparatus for reproducing a content that is received from an administrative server that administrates the content, the administrative server holding identification information of a portable communication apparatus that is permitted to use the content or an owner of the portable communication apparatus who is permitted to use the content, and the administrative server providing the content in response to a request from a portable communication apparatus or an owner specified by the identification information, and the reproducing apparatus of the present invention includes: first receiving means for receiving, from a portable communication apparatus, (a) content request information for requesting the administrative server to transmit the content, (b) identification information for identifying the portable communication apparatus or an owner of the portable communication apparatus, and (c) transmission time point information indicative of a point of time when the portable communication apparatus has transmitted the content request information; and first transmitting means for transmitting, to the administrative server, the content request information, the identification information, and the transmission time point information by establishing a connection to the administrative server based on the content request information received by the first receiving means.

In the above arrangement, since the reproducing apparatus includes the first receiving means and the first transmitting means, the reproducing apparatus can transmit, to the administrative server, the identification information, the transmission time point information, and the content request information, which are received from the portable communication apparatus. As a result, the reproducing apparatus can ensure the authenticity of the content request information for requesting the content, with respect to the administrative server. That is, the reproducing apparatus of the present invention can ensure, by the identification information, that the content request information is transmitted from an owner of the portable communication apparatus that is permitted to use the content. Further, with the above arrangement, since the transmission time point information is also transmitted to the administrative server, the administrative server can be notified of the timing when the portable communication apparatus has transmitted the content request information. As a result, the administrative server can find whether or not the information is eavesdropped during a transmission path from a point of time when the content request information has been transmitted from the portable communication apparatus until the content request information is received by the administrative server. That is, in a case where there is a large time lag between the time when the portable communication apparatus has transmitted the content request information and the time when the administrative server receives the content request information, it can be judged that the eavesdropping may be performed.

Consequently, the reproducing apparatus according to the present invention can yield such an effect that in a case where the reproducing apparatus receives, in response to content request information received from the portable communication apparatus, a content from the administrative server that administrates the content, it is possible that the administrative server can check whether or not the reproducing apparatus is an authentic destination of the content.

Further, in order to achieve the above object, a portable communication apparatus according to the present invention is portable communication apparatus whose identification information is registered in an administrative serve that administrates a content so that the administrative server identifies that the portable communication apparatus or an owner of the portable communication apparatus is permitted to use the content, and the portable communication apparatus of the present invention includes: acquisition means for acquiring content request information for requesting the administrative server to transmit the content; an identification information storage device in which the identification information is stored; a first clock section for measuring a transmission time point that is a point of time at which to transmit the content request information acquired by the acquisition means, to a reproducing apparatus for reproducing the content; transmission data forming means for forming transmission data to be transmitted to the reproducing apparatus, based on the content request information acquired by the acquisition means, the identification information stored in the identification information storage device, and transmission time point information indicative of the transmission time point measured by the first clock section; and second transmitting means for transmitting, to the reproducing apparatus, the transmission data formed by the transmission data forming means.

In the above arrangement, since the portable communication apparatus includes the acquisition means, the portable communication apparatus can acquire content request information. Furthermore, since the portable communication apparatus includes the identification information storage device and the first clock section, the portable communication apparatus can acquire the identification information and the transmission time point information. Accordingly, it is possible to form transmission data including those pieces of information by the transmission data forming means and to transmit, to the reproducing apparatus, the transmission data by the second transmitting means.

As a result, the reproducing apparatus can obtain (i) the content request information, (ii) the identification information of the portable communication apparatus that is registered as a portable communication apparatus permitted to use the content or an owner of the portable communication apparatus who is registered as an owner permitted to use the content, and (iii) the transmission time point information indicative of time when the content request information has been transmitted from the portable communication apparatus.

Consequently, the reproducing apparatus can request, in accordance with the content request information, the administrative server to provide the content, and ensures to the administrative server, by the identification information, that the request is made in response to a request from a portable communication apparatus that is registered as a portable communication apparatus permitted to use the content or an owner of the portable communication apparatus who is registered as an owner permitted to use the content. Furthermore, the reproducing apparatus can ensure, by the transmission time point information, that those pieces of information transmitted to the administrative server are not ones that have been improperly obtained and transmitted.

As a result, the portable communication apparatus according to the present invention successfully allows the administrative server that administrates a content, to check whether or not the reproducing apparatus is authentic as a destination that can receive the content from the administrative server, based on the content request information transmitted to the reproducing apparatus.

In order to achieve the above object, an administrative server of the present invention is an administrative server that administrates a content, and includes: an identification information storage device in which to store identification information for identifying whether or not a portable communication apparatus or an owner of the portable communication apparatus is permitted to use the content; a second clock section for measuring reception time point information indicative of a point of time when the administrative server has received, from a reproducing apparatus for reproducing the content, (a) content request information for requesting transmission of the content, (b) identification information, and (c) transmission time point information indicative of a point of time when the portable communication apparatus has transmitted the content request information to the reproducing apparatus, in a case where the administrative server receives these pieces of information from the reproducing apparatus; judging means for judging authenticity of the content request information thus received, based on the identification information thus received and a difference between the transmission time point information and the reception time point information; and transmission determining means for determining a content to be transmitted to the reproducing apparatus, when the judging means judges that the content request information thus received is authentic, the judging means judging that the content request information thus received is authentic, when it is verified that the identification information thus received has been already stored in the identification information storage apparatus and the difference between the transmission time point information and the reception time point information is within a predetermined range.

In the above arrangement, since the administrative server includes the identification information storage device, the judging means can check whether or not the received identification information is identical with identification information of a portable communication apparatus that is registered as a portable communication apparatus permitted to use the content or an owner of the portable communication apparatus who is registered as an owner permitted to use the content. That is, the administrative server can check whether or not the content request is a request from the portable communication apparatus or the owner of the portable communication apparatus which/who is permitted to use the content.

Further, since the administrative server includes the second clock section, the judging means compares the received transmission time point information and the reception time point information measured by the second clock section, so as to find out a time lag between a time point of transmission of content request information from the portable communication apparatus and a time point of reception of the content request information by the administrative server. This allows the judging means to judge, based on the time lag, whether the content request information thus received has been properly transmitted to the administrative server via an authorized transmission path or has been improperly transmitted to the administrative server from an unauthentic person who improperly acquired the content request information.

Consequently, the administrative server of the present invention yields such an effect that in a case where the administrative server provides a content to a reproducing apparatus in response to content request information received from the reproducing apparatus, the administrative server can check whether or not the reproducing apparatus is an authentic destination of the content.

A content distribution system according to the present invention includes: a reproducing apparatus; a portable communication apparatus; and an administrative server. In order to achieve the above object, the reproducing apparatus included in the content distribution system of the present invention is a reproducing apparatus for reproducing a content that is received from an administrative server that administrates the content, the administrative server holding identification information of a portable communication apparatus that is permitted to use the content or an owner of the portable communication apparatus who is permitted to use the content, and the administrative server providing the content in response to a request from a portable communication apparatus or an owner specified by the identification information, and the reproducing apparatus includes: first receiving means for receiving, from a portable communication apparatus, (a) content request information which includes location information indicative of where the content managed by the administrative server is located and which is for requesting the administrative server to transmit the content, (b) identification information for identifying the portable communication apparatus or an owner of the portable communication apparatus, and (c) transmission time point information indicative of a point of time when the portable communication apparatus has transmitted the content request information; and first transmitting means for transmitting, to the administrative server, the content request information, the identification information, and the transmission time point information by establishing a connection to the administrative server based on the content request information received by the first receiving means. Further, in order to achieve the above object, the portable communication apparatus included in the content distribution system of the present invention is a portable communication apparatus whose identification information is registered in an administrative serve that administrates a content so that the administrative server identifies that the portable communication apparatus or an owner of the portable communication apparatus is permitted to use the content, and the portable communication apparatus includes: acquisition means for acquiring content request information for requesting the administrative server to transmit the content; an identification information storage device in which the identification information is stored; a clock section for measuring transmission time point that is a point of time at which to transmit the content request information acquired by the acquisition means, to a reproducing apparatus for reproducing the content; transmission data forming means for forming transmission data to be transmitted to the reproducing apparatus, based on the content request information acquired by the acquisition means, the identification information stored in the identification information storage device, and transmission time point information indicative of the transmission time point measured by the clock section; and second transmitting means for transmitting, to the reproducing apparatus, the transmission data formed by the transmission data forming means. Furthermore, in order to achieve the above object, the administrative server included in the content distribution system of the present invention is an administrative server that manages a content, and includes: an identification information storage device in which to store identification information for identifying whether or not a portable communication apparatus or an owner of the portable communication apparatus is permitted to use the content; a second clock section for measuring reception time point information indicative of a point of time when the administrative server has received, from a reproducing apparatus for reproducing the content, (a) content request information for requesting transmission of the content, (b) identification information, and (c) transmission time point information indicative of a point of time when the portable communication apparatus has transmitted the content request information to the reproducing apparatus, in a case where the administrative server receives these pieces of information from the reproducing apparatus; judging means for judging authenticity of the content request information thus received, based on the identification information thus received and a difference between the transmission time point information and the reception time point information; and transmission determining means for determining a content to be transmitted to the reproducing apparatus, when the judging means judges that the content request information thus received is authentic, the judging means judging that the content request information thus received is authentic, when it is verified that the identification information thus received has been already stored in the identification information storage apparatus and the difference between the transmission time point information and the reception time point information is within a predetermined range.

With the above arrangement, the content distribution system according to the present invention can yield such an effect that when the reproducing apparatus transmits, to the administrative server, content request information received from the portable communication apparatus, the administrative server can judge authenticity of the content request information and find out whether or not the reproducing apparatus is an authentic destination of the content.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1 is a view schematically illustrating an information distribution system according to an embodiment of the present invention.

FIG. 2 is a perspective view illustrating one example of an outer shape of a portable communication apparatus according to the present embodiment.

FIG. 3 is a perspective view illustrating an example of the outer shape of the portable communication apparatus of the present embodiment.

FIG. 4 is a view schematically illustrating a data structure of transmission data, according to the present embodiment.

FIG. 5 is a block diagram illustrating an arrangement of an essential part of a portable communication apparatus according to an embodiment of the present invention.

FIG. 6 is a block diagram illustrating a software structure of a portable communication apparatus according to an embodiment of the present invention.

FIG. 7 is a view illustrating an exemplary comparison of an authorized transmission path from a portable communication apparatus to a service-providing server and an unauthorized transmission path via which information is eavesdropped.

FIG. 8

FIG. 8 is a block diagram illustrating a hardware structure of a reproducing apparatus according to an embodiment of the present invention.

FIG. 9 is a block diagram illustrating a software structure of a reproducing apparatus according to an embodiment of the present invention.

FIG. 10 is a block diagram illustrating an arrangement of an essential part of a service-providing server according to an embodiment of the present invention.

FIG. 11

FIG. 11 is a view illustrating one exemplary invitation information list according to an embodiment of the present invention.

FIG. 12

FIG. 12 is a view illustrating one exemplary user list according to an embodiment of the present invention.

FIG. 13 is a view illustrating a flow of information related to preprocessing of a service-providing process in an information distribution system according to an embodiment of the present invention.

FIG. 14 is a flowchart illustrating a process flow in a service-providing process in an information distribution system according to an embodiment of the present invention.

FIG. 15 is a flowchart illustrating a process flow of a verification process in a service-providing server according to an embodiment of the present invention.

FIG. 16 is a view schematically illustrating an arrangement of an information distribution system according to Example 1 in an embodiment of the present invention.

FIG. 17 is a view schematically illustrating an arrangement of an information distribution system according to Example 2 in an embodiment of the present invention.

FIG. 18 is a view schematically illustrating an arrangement of an information distribution system according to Example 3 in an embodiment of the present invention.

FIG. 19 is a process flow diagram illustrating one example of a coupon (invitation information) acquisition process in a portable communication apparatus, according to Example 3 of an embodiment of the present invention.

FIG. 20 is a process flow diagram illustrating one example of a coupon (invitation information) acquisition process in a portable communication apparatus, according to Example 3 of an embodiment of the present invention.

FIG. 21 is a process flow diagram illustrating one example of a coupon (invitation information) communication apparatus, according to Example 3 of an embodiment of the present invention.

DESCRIPTION OF EMBODIMENTS

Figure 1:
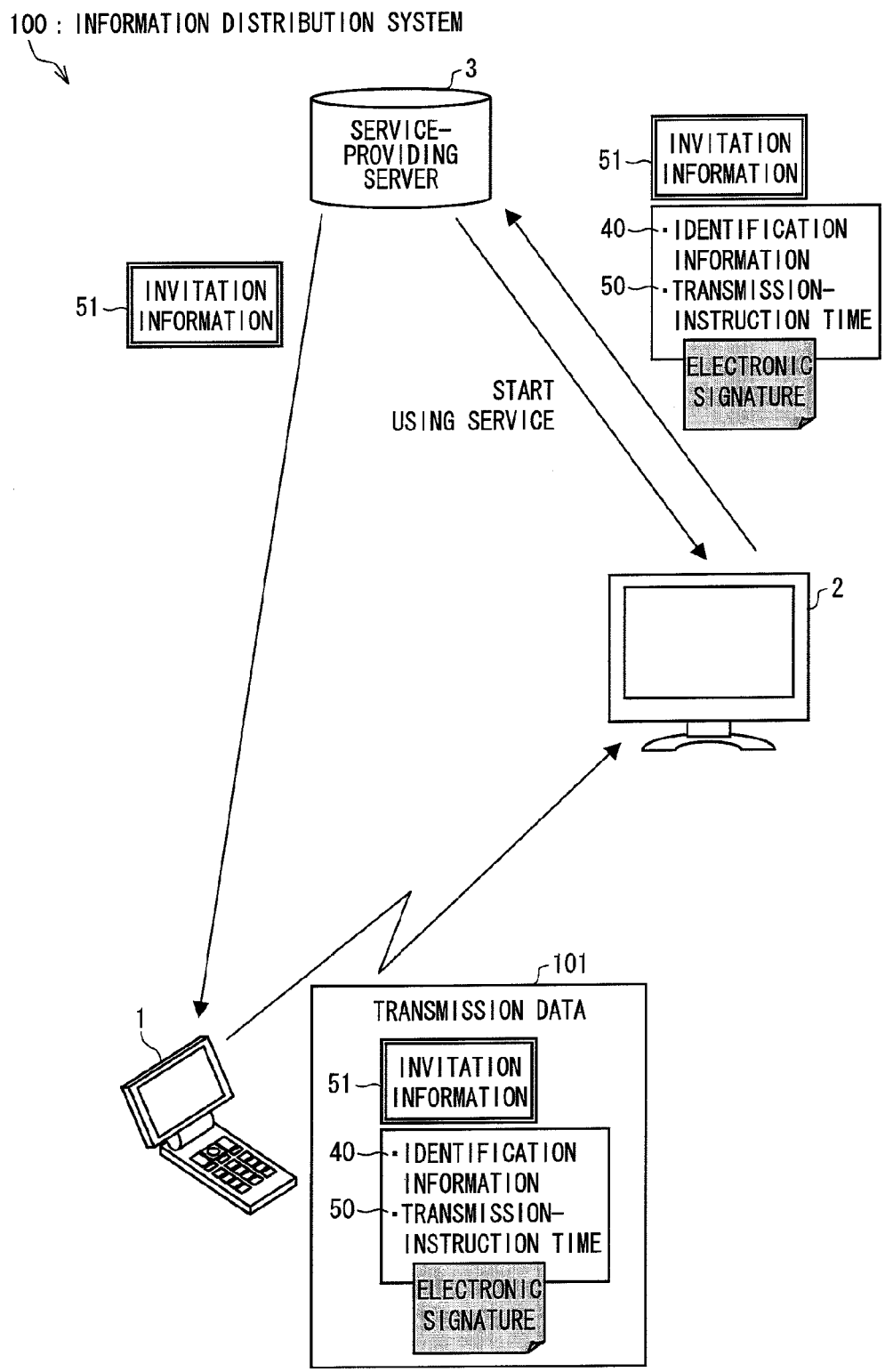
FIG. 1

One embodiment of the present invention is described below with reference to FIG. 1 through FIG. 21. As illustrated in FIG. 1, an information distribution system 100 according to the present embodiment includes: a portable communication apparatus 1; a reproducing apparatus 2; and a service-providing server (administrative server) 3. FIG. 1 is a view schematically illustrating the information distribution system 100 according to the embodiment of the present invention.

The portable communication apparatus 1 has functions of, for example, (i) establishing communication with another portable communication apparatus via a base station and (ii) accessing a certain WEB site (content) 54 over a communications network. The portable communication apparatus 1 can be realized by a device, such as a mobile phone device or a PDA (Personal Digital (Data) Assistants).

Figure 2:
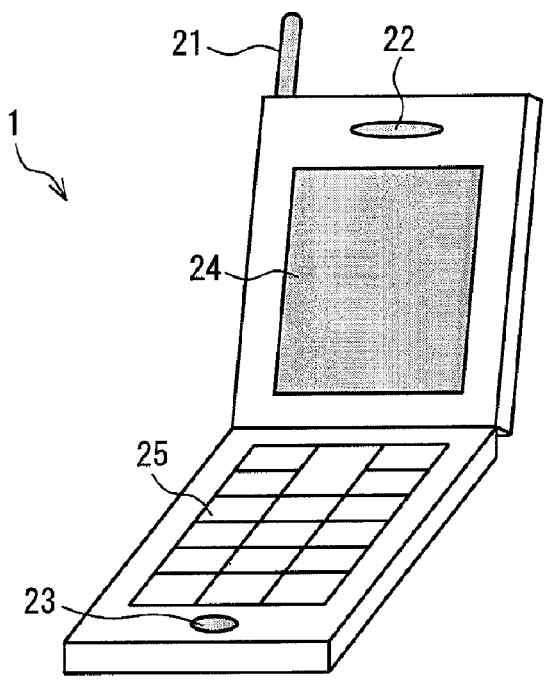
FIG. 2
Figure 3:
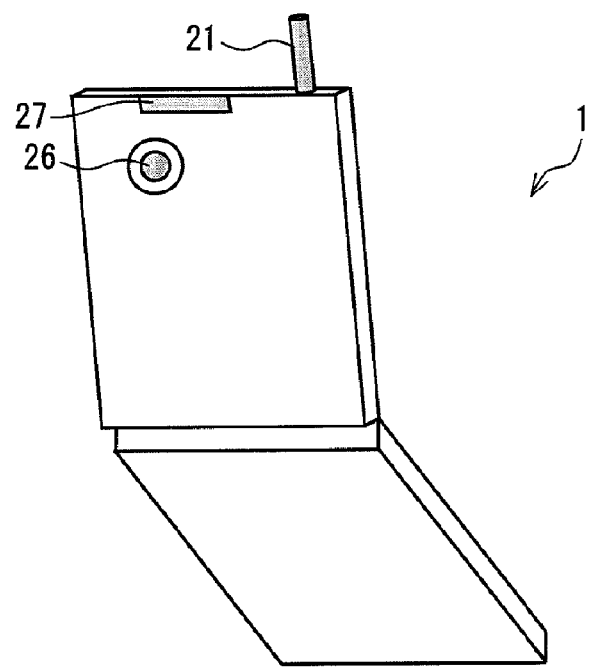
FIG. 3

The portable communication apparatus 1 has an outer shape including: an antenna 21 for establishing communication with the base station; a speaker 22 through which audio is outputted during a call; a microphone 23 through which audio is inputted during the call; a display section 24 on which various information is displayed; and an operation section 25 via which various information is inputted (see FIG. 2). The portable communication apparatus 1 further includes, on a surface of its housing opposite to another surface of the housing on which the display section 24 is provided, an image capture section (image acquisition section) 26 and an infrared communication section 27 (see FIG. 3). FIGS. 2 and 3 are perspective views each illustrating an example of the outer shape of the portable communication apparatus 1 according to the present embodiment.

The portable communication apparatus 1 also has such a function of (i) acquiring invitation information (content request information) 51 including (a) a URL (location information) of the certain WEB site 54 and (b) a service ID that identifies a service obtainable from the WEB site 54, (ii) embedding the invitation information 51 into image data, and then (iii) transmitting the image data, as transmission data 101, to the reproducing apparatus 2 via the infrared communication section 27. This function is described later in detail. As described later, the transmission data 101 is normal image data, which is in a commonly-used format, such as a JPEG format or a TIFF format, and includes process-specifying information which specifies a process to be executed by the reproducing apparatus 2, a URL to be accessed by the reproducing apparatus 2, and the like. When the reproduction apparatus 2 receives the transmission data 101 transmitted from the portable communication apparatus 1, the reproducing apparatus 2 immediately executes the process that is specified by the process-specifying information included in the transmission data 101.

The infrared communication section 27 uses IrSS (registered trademark) to transmit the image data that includes the invitation information 51, to the reproducing apparatus 2. The IrSS is a high-speed infrared communication protocol, which is used for one-way communication compliant with IrSimple (registered trademark) 1.0. This allows the portable communication apparatus 1 to perform high-speed transmission of the transmission data 101 to the reproducing apparatus 2.

Meanwhile, the portable communication apparatus 1 acquires the invitation information 51 by any of the following methods, for example: a method in which the portable communication apparatus 1 requests transmission of the invitation information 51 to the service-providing server 3, which administrates access to the certain WEB site 54, and thereby acquires the invitation information 51 from the service-providing server 3; a method in which the portable communication apparatus 1 acquires, as the invitation information 51, the URL of the WEB site 54 that is currently browsed on the portable communication apparatus 1; a method in which the portable communication apparatus 1 acquires the invitation information 51 from a two-dimensional code, such as QR code (registered trademark), by capturing an image of the two-dimensional code by use of the image capture section 26; and a method in which the portable communication apparatus 1 acquires the invitation information 51 from a reader/writer which distributes the invitation information 51 at a specific location.

The following description is given on an assumption that the portable communication apparatus 1 acquires the invitation information 51 by requesting the service-providing server 3 to transmit the invitation information 51 to the portable communication apparatus 1. Other methods of acquiring the invitation information 51 are described later in Examples 1 through 3.

The reproducing apparatus 2 is configured to transmit, to the service-providing server 3 that administrates a WEB site 54, a request for access to the WEB site 54 designated by the URL included in the invitation information 51 received from the portable communication apparatus 1. The reproducing apparatus 2 is also configured to, when the request for access to the WEB site 54 is accepted, obtain information of the WEB site 54 and then reproduce the information. The reproducing apparatus 2 can be realized by, for example, a display device which is capable of displaying digital image data and of communicating with the service-providing server 3.

The service-providing server 3 issues, for a terminal of an authentic user, a permission for access to the WEB site 54 which is under management of the service-providing server 3, when the service-providing server 3 receives the request for access to the WEB site 54 from the terminal of the authentic user. That is, according to the information distribution system 100 of the present embodiment, "a service provided by the service-providing server 3" refers to "a permission only for a specific user to obtain information of the certain WEB site 54". However, the service provided by the service-providing server 3 is not limited to the above permission. The service-providing server 3 may be configured to hold content data, such as image data or audio data, and to provide the content data. Note that a verification process, performed by the service-providing server 3, of verifying whether or not the access to the WEB site 54 is allowed is described later in detail.

(Transmission Data)

Figure 4:
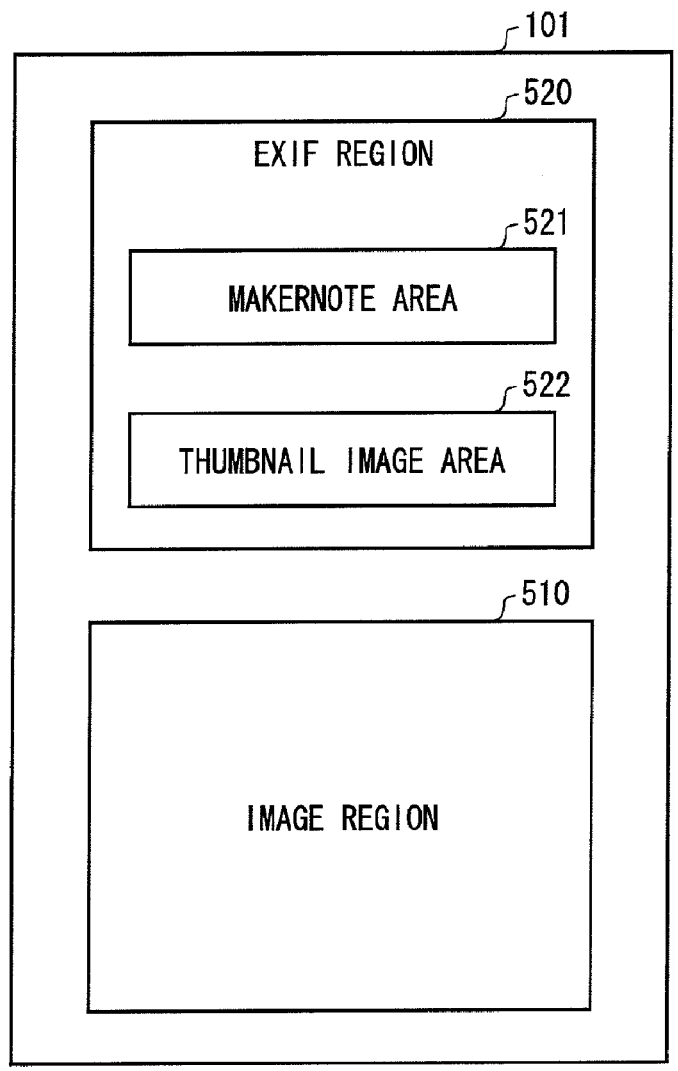
FIG. 4

First, a data structure of the transmission data 101, which is transmitted from the portable communication apparatus 1 to the reproducing apparatus 2, is described below with reference to FIG. 4. FIG. 4 is a view schematically illustrating the data structure of the transmission data 101. As schematically illustrated in FIG. 4, the transmission data 101 is JPEG image data including an image region 510 and an EXIF region 520.

The image region 510 is a region in which to store image information that is to be displayed. The image information stored in the image region 510 is in a compressed state. On the other hand, the EXIF information 520 is a region in which to store meta-information of the image information that is stored in the image region 510. The EXIF region 520 includes a MakerNote area 521, whose specification can be freely determined by a manufacturer of a digital camera etc. The EXIF region 520 further includes a thumbnail image area 522 in which to store a thumbnail image obtained by scaling down a main image stored in the image region 510.

In the image region 510 and the thumbnail image area 522 may be also stored what is called an icon image, which symbolizes information that is stored in the MakerNote area 521. When information included in the transmission data 101 is displayed on the portable communication apparatus 1, it is possible for a user to know what process is included in the transmission data 101.

(Hardware Structure of Mobile Communication Device)

Figure 5:
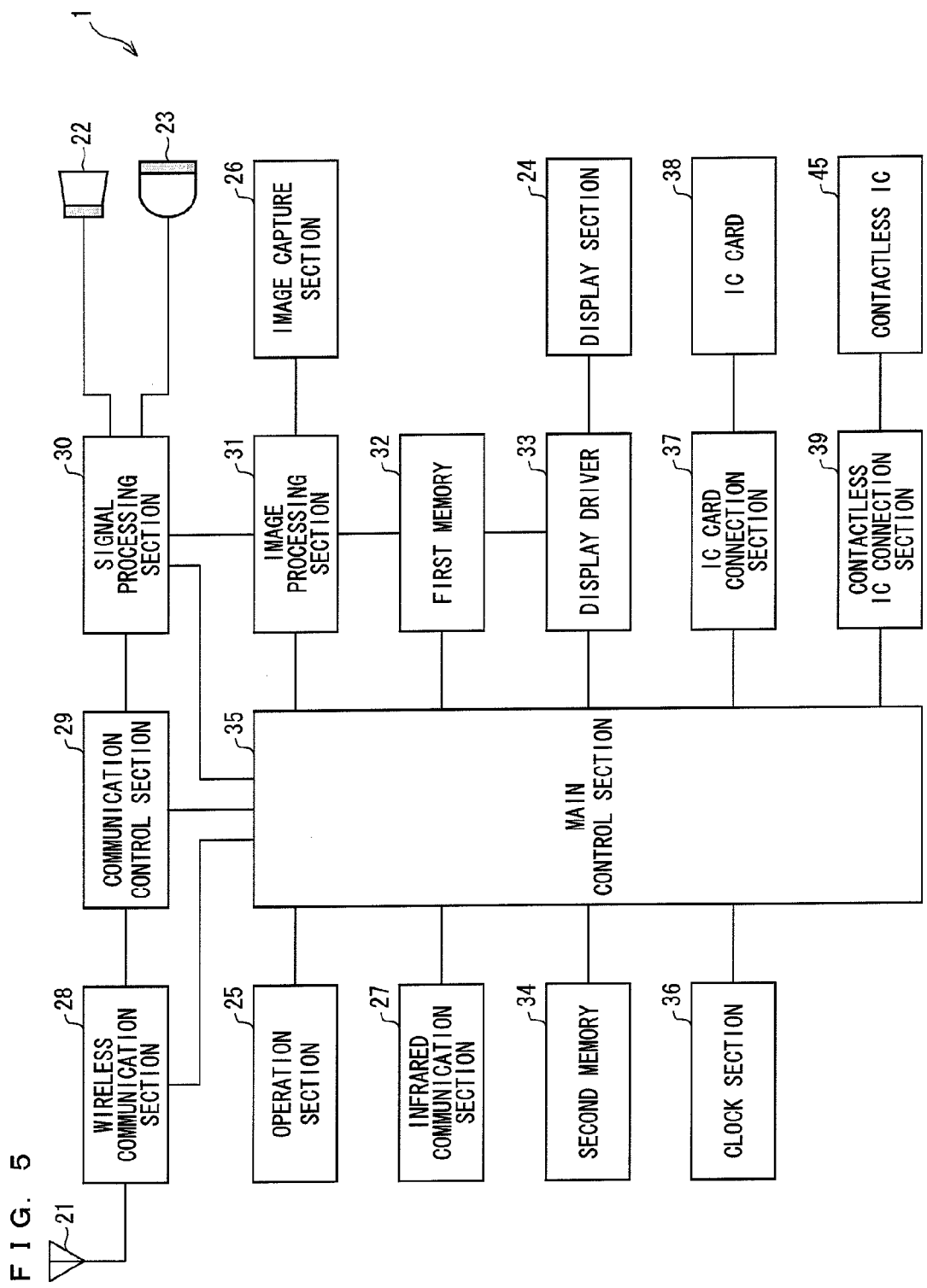
FIG. 5

A hardware structure of the above portable communication apparatus 1 is described below with reference to FIG. 5. FIG. 5 is a block diagram illustrating an arrangement of an essential part of the portable communication apparatus 1 according to the embodiment of the present invention.

As illustrated in FIG. 5, the portable communication apparatus 1 includes: the antenna 21; the speaker 22; the microphone 23; the display section 24; the operation section 25; the image capture section 26; and the infrared communication section 27. The portable communication apparatus 1 further includes: a wireless communication section 28; a communication control section 29; a signal processing section 30; an image processing section 31; a first memory 32; a display driver 33; a second memory 34; a main control section 35; a clock section (a first clock section) 36; an IC card connection section 37; and a contactless IC connection section 39. The portable communication apparatus 1 according to the present embodiment is arranged such that the portable communication apparatus 1 is connected to an IC card (an identification information storage device) 38 via the IC card connection section 37, and connected to a contactless IC 45 via the contactless IC connection section 39.

The IC card 38 is what is called a SIM card (Subscriber Identity Module Card), in which a unique ID that specifies a telephone number used on the portable communication apparatus 1 is stored. The portable communication apparatus 1 obtains, in response to a control instruction from the main control section 35, the unique ID from the IC card 38 via the IC card connection section 37. The unique ID thus obtained is used as identification information 40 of the portable communication apparatus 1.

The contactless IC 45 is activated upon receiving a radio wave emitted by, for example, a reader/writer (described later). Subsequently, the contactless IC 45 transmits, to the main control section 35 via the contactless IC connection section 39, information based on the radio wave thus received. Since the portable communication apparatus 1 according to the present embodiment is connected to the contactless IC as such, it is possible for the portable communication apparatus 1 to obtain the information transmitted from the reader/writer merely by being placed near the reader/writer. In view of this, the portable communication apparatus 1 also has a payment function to make payment for purchase of a product so that payment for purchase of a product is made by use of the portable communication apparatus 1 in a case where the reader/writer is installed in a store. The payment operation is performed such that various pieces of information are exchanged between the portable communication apparatus 1 and the reader/writer.

The first memory 32 functions as a buffer. On the other hand, the second memory 34 is like a flash memory in which to store data permanently. The first memory 32 and the second memory 34, which are storage devices of the portable communication apparatus 1, can be modified in terms of their structures, depending on specification of the portable communication apparatus 1. For example, the first memory 32 and the second memory 34 may be provided in an integrated manner. In the second memory 34 are stored pieces of invitation information 51 that the portable communication apparatus 1 has acquired and a user certificate 52 that certifies that the user of the portable communication apparatus 1 is an authentic user. The invitation information 51 is obtainable from the service-providing server 3 through an application process of the invitation information 51 (this process is described later). The user certificate 52 is obtainable from a certification issuing server through a certificate issuance process (this process is described later).

The portable communication apparatus 1 arranged as above is capable of executing functions, such as a call function, a camera function, and a code reading function, in the following manner.

In the portable communication apparatus 1, first, the wireless communication section 28 transmits/receives a signal to/from the base station (not illustrated) via the antenna 21 under control of the communication control section 29. Then, the signal processing section 30 performs a predetermined signal processing with respect to the signal to be transmitted to/from the wireless communication section 28. This process realizes what is called a call function in which (i) audio transmitted from another device via the base station is outputted from the speaker 22 and (ii) audio inputted through the microphone 23 is transmitted to the another device via the base station.

The portable communication apparatus 1 further includes the image capture section 26, which includes a CCD (charge coupled device) or CMOS. In response to a camera activation instruction inputted via the operation section 25, the image processing section 31 activates the image capture section 26 so as to cause the image capture section 26 to capture an image. The image processing section 31 then adjusts exposure and image quality etc. of the image thus taken. The image thus adjusted is stored in the first memory 32 so that the image is previewed on the display section 24. Here, if the operation section 25 receives an instruction of saving the image while the image is being previewed on the display section 24, the image is stored in the second memory 34. The portable communication apparatus 1 realizes what is called a camera function with a series of actions as above.

In the portable communication apparatus 1, the image capture section 26 is activated in response to not only the camera activation instruction but also a code reading instruction to read a code, such as QR code. That is, when the operation section 25 receives the code reading instruction, the image capture section 26 is activated so as to capture an image of the code and the display section 24 displays a preview of the image thereon. Then, upon receiving, via the operation section 25, an instruction of starting reading the code, the main control section 19 analyzes image data of the code thus captured by the image capture section 26. An analysis result is transitorily stored in the first memory 32. After the analysis result of the image of the code thus captured is stored in the first memory 32 as such, the display driver 33 reads out the analysis result in response to an instruction from the main control section 35 so that the analysis result is displayed on the display section 24.

As described above, the portable communication apparatus 1 according to the present embodiment is capable of displaying, on the display section 24, information stored in a two-dimensional code, such as QR code. In other words, the portable communication apparatus 1 according to the present embodiment can realize what is called a code reading function through the above processes.

The portable communication apparatus 1 further includes the clock section 36. This makes it possible to obtain a point of time when each action is performed.

It should be noted that the portable communication apparatus 1 is arranged such that members included in the portable communication apparatus 1 execute respective actions in response to respective control instructions given by the main control section 35.

(Software Structure of Portable Communication Apparatus)

Figure 6:
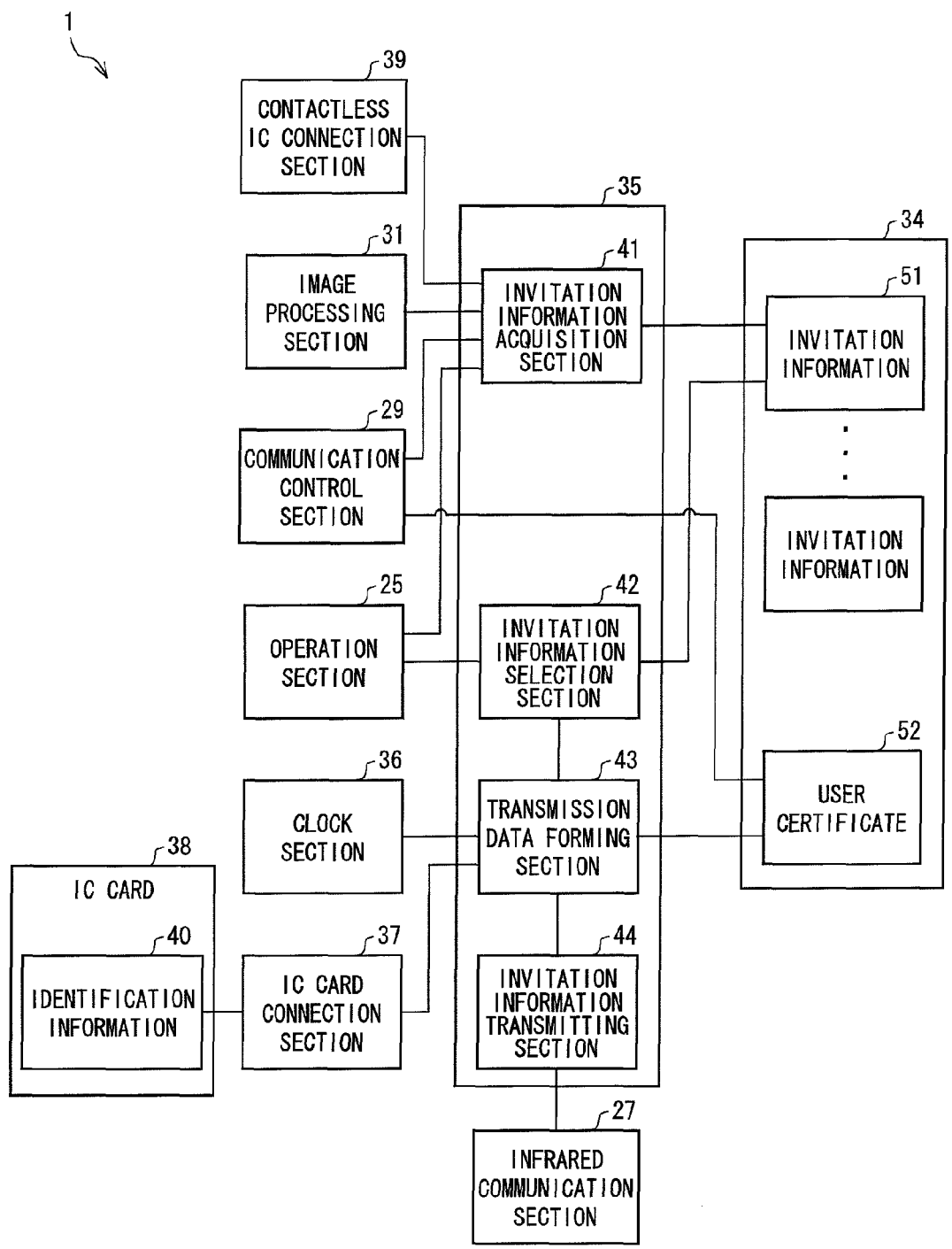
FIG. 6

The following description discusses, with reference to FIG. 6, a software structure related to a transfer process which is performed by the above portable communication apparatus 1 to transfer the invitation information 51. FIG. 6 is a block diagram illustrating a software structure of the portable communication apparatus 1 according to the embodiment of the present invention. As illustrated in FIG. 6, the portable communication apparatus 1 includes, as functional blocks, an invitation information acquisition section (acquisition means) 41, an invitation information selection section 42, a transmission data forming section (transmission data forming means) 43, and an invitation information transmitting section 44. These functional blocks are realized in such a manner that, in a case where the main control section 35 is realized by a CPU or the like, the CPU loads a program stored in the second memory 34 into the first memory 32 so as to execute the program.

The invitation information acquisition section 41 acquires the invitation information 51 via the image processing section 31, the contactless IC connection section 39, or the communication control section 29. For example, in a case where the portable communication apparatus 1 acquires a piece of invitation information 51 from a predetermined service-providing server 3, the portable communication apparatus 1 acquires the piece of invitation information 51 via the antenna 21, the wireless communication section 28, and the communication control section 29. In a case where the portable communication apparatus 1 acquires a piece of invitation information 51 from a printed two-dimensional code, such as QR code, the portable communication apparatus 1 acquires the piece of invitation information 51 via the image capture section 26 and the image processing section 31. In a case where the portable communication apparatus 1 acquires a piece of invitation information 51 that is issued at a store, the portable communication apparatus 1 acquires the piece of invitation information 51 in such a manner that the contactless IC (information acquisition section) 45 receives the piece of invitation information 51 from a reader/writer that issues the piece of invitation information 51, and then transmits the received piece of invitation information 51 to the main control section 35 via the contactless IC connection section 39. The acquisition means of the present invention is realized by (i) the invitation information acquisition section 41 and the image processing section 31, (ii) the invitation information acquisition section 41 and the contactless IC connection section 39, or (iii) the invitation information acquisition section 41 and the communication control section 29.

The invitation information selection section 42 selects which piece of invitation information 51 is transmitted from the second memory 34 to the reproducing apparatus 2. Specifically, upon receiving, via the operation section 25, a transmission instruction of the invitation information 51 to the reproducing apparatus 2, the invitation information selection section 42 selects and reads out, from the second memory 34, a piece of invitation information 51 that the user desires to transmit. The invitation information selection section 42 then transmits, to the transmission data forming section 43, the piece of invitation information 51 thus read out.

The transmission data forming section 43 forms transmission data 101 which includes the invitation information 51 transmitted from the invitation information selection section 42 and which is to be transmitted to the reproducing apparatus 2 via the infrared communication section 27. Specifically, upon receiving, from the invitation information selection section 42, the invitation information 51 to be transmitted, the invitation information transmission section 44 forms the transmission data 101 which includes (a) the invitation information 51, (b) identification information 40 obtained from the IC card 38 via the IC card connection section 37, and (c) a transmission-instruction time (transmission time point information) 50 obtained from the clock section 36.

The reason why the transmission-instruction time 50 is included in the transmission data 101 is (i) to prevent the identification information 40 etc. from being eavesdropped or (ii) to prevent spoofing or the like, as described later. Specifically, in the information distribution system 100 of the present embodiment, the invitation information 51 acquired by the portable communication apparatus 1 is transmitted, together with the identification information 40 and the like, to the reproducing apparatus 2. The reproducing apparatus 2 then transmits the identification information 40 and the like information to the service-providing server 3 through a transmission path that is established between the reproducing apparatus 2 and the service-providing server 3.

Figure 7:
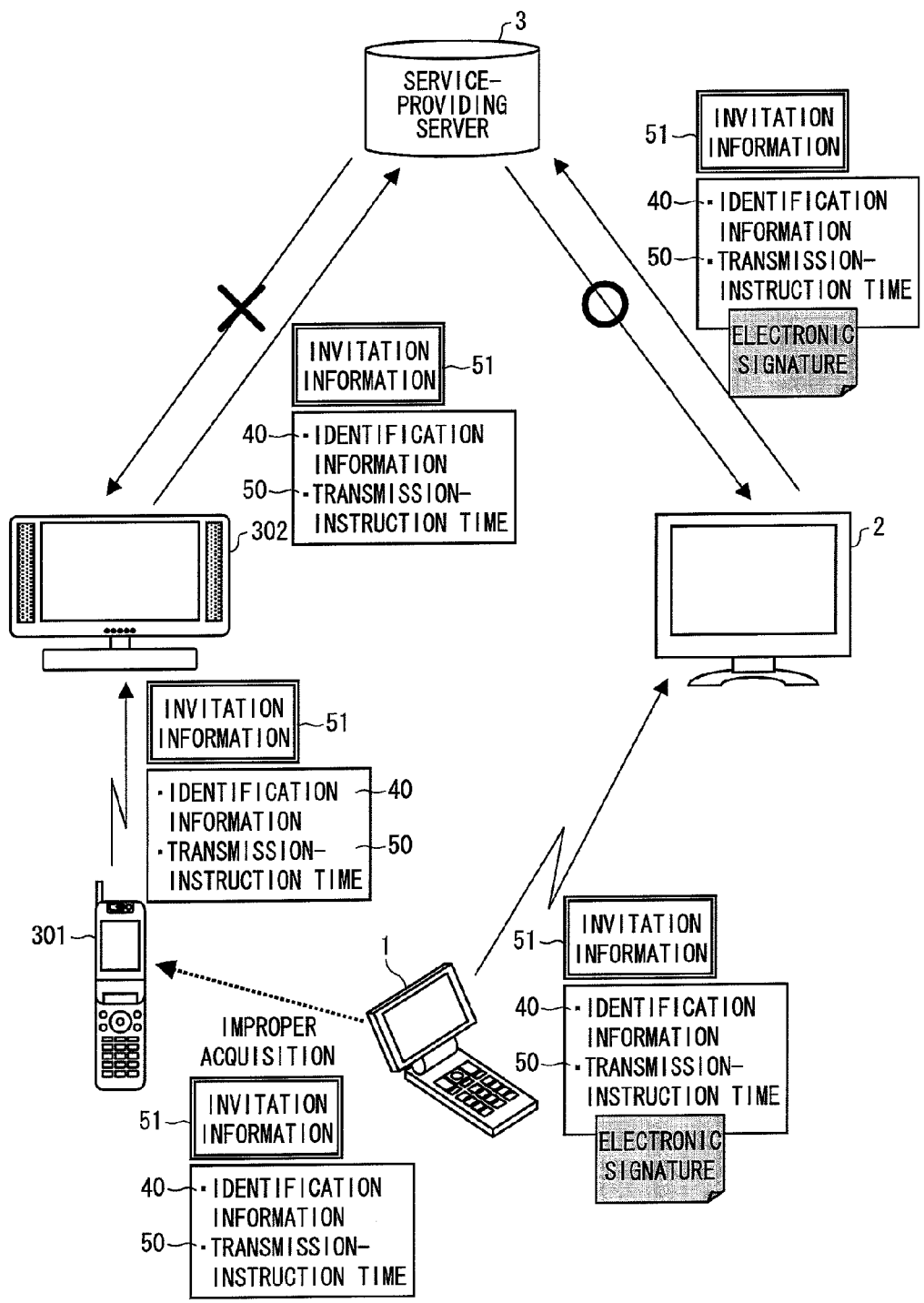
FIG. 7

As illustrated in FIG. 7, the invitation information 51, the identification information 40 of the portable communication apparatus 1, and the like information may be eavesdropped during transmission from the portable communication apparatus 1 to the reproducing apparatus 2, and/or during transmission from the reproducing apparatus 2 to the service-providing server 3. If worse comes to worst, it may be possible that another portable communication apparatus 301 makes a request for information of the WEB site 54 to the service-providing server 3 via another reproducing apparatus 302, by using eavesdropped information. FIG. 7 is a view illustrating an exemplary comparison of an authorized transmission path from the portable communication apparatus 1 to the service-providing server 3 and an unauthorized transmission path via which information is eavesdropped.

In view of this, the portable communication apparatus 1 of the present embodiment transmits, to the reproducing apparatus 2, the transmission time point at which a transmission instruction is made, together with the invitation information 51 and the identification information 40. In this way, ultimately, the service-providing server 3 is able to know a time taken for the identification information 40 and the like to be transmitted from the portable communication apparatus 1 to the service-providing server 3.

If the time is long, i.e., if a difference between (i) the transmission-instruction time 50 of the identification information 40 and the like and (ii) a reception time point when the service-providing server 3 receives the identification information 40 and the like is greater than a threshold, then it is possible to judge that the identification information 40 and the like are ones eavesdropped by the another portable communication apparatus 301 during communication.

Moreover, the portable communication apparatus according to the present embodiment is arranged such that an electronic signature (signature information) is attached to the transmission data (i.e., the identification information 40 and the like), so as to improve safety of transmission of the transmission data.

Specifically, the user certificate 52 issued as above includes a secret key, which is for encrypting information to be transmitted to the reproducing apparatus 2 via the infrared communication section 27. That is, the portable communication apparatus 1 first produces a hash value from information (the identification information 40 and transmission-instruction time 50 etc.) to be transmitted, in the form of image data, to the reproducing apparatus 2. The portable communication apparatus 1 then creates an electronic signature by encrypting the hash value with the use of the secret key. Then, the portable communication apparatus 1 transmits the electronic signature together with the information to be transmitted to the reproducing apparatus 2 so as to certify that the information thus transmitted is valid information.

(Hardware Structure of Reproducing Apparatus)

The following description discusses a hardware structure of the reproducing apparatus 2 with reference to FIG. 8. FIG. 8 is a block diagram illustrating the hardware structure of the reproducing apparatus according to the embodiment of the present invention.

As illustrated in FIG. 8, the reproducing apparatus 2 according to the present embodiment includes: a reproducing apparatus infrared communication section (first receiving means) 60; a communication interface 61; a reproducing apparatus communication control section (first transmitting means) 62; a reproducing apparatus display control section

63; a reproducing apparatus display section 64; a reproducing apparatus first memory 65; a reproducing apparatus second memory 66; and a reproducing apparatus main control section 67.

The reproducing apparatus infrared communication section 60 receives, in response to a control instruction given by the reproducing apparatus main control section 67, image data (the transmission data 101) that is transmitted in accordance with IrSS. Then, the reproducing apparatus infrared communication section 60 converts the image data into a format supported by the reproducing apparatus 2. For example, in a case where the transmission data 101 transmitted in accordance with IrSS is to be displayed on the reproducing apparatus 2, the received transmission data 101 is converted into a data format that can be displayed on the reproducing apparatus display section 64.

The communication interface 61 is provided so that the reproducing apparatus 2 is connected with another device over a communications network. More specifically, in the reproducing apparatus 2 of the present embodiment, the communication interface 61 is capable of establishing a connection to the service-providing server 3 via the communications network, in response to the control instruction given by the reproducing apparatus communication control section 62.

The reproducing apparatus display control section 63 causes, in response to an instruction from the reproducing apparatus main control section 67, the reproducing apparatus display section 64 to display an image or the like. It should be noted that a display screen of the reproducing apparatus display section 64 is larger, in vertical and horizontal size, than a display screen of the display section 24 of the portable communication apparatus 1.

The reproducing apparatus first memory 65 functions a buffer. On the other hand, the reproducing apparatus second memory 66 is like a flash memory in which to store data permanently. The reproducing apparatus first memory 65 and the reproducing apparatus second memory 66, which are storage devices of the reproducing apparatus 2, can be modified in terms of their structures depending on specification of the reproducing apparatus 2. For example, the reproducing apparatus first memory 65 and the reproducing apparatus second memory 66 may be provided in an integrated manner.

(Software Structure of Reproducing Apparatus)

Figure 9:
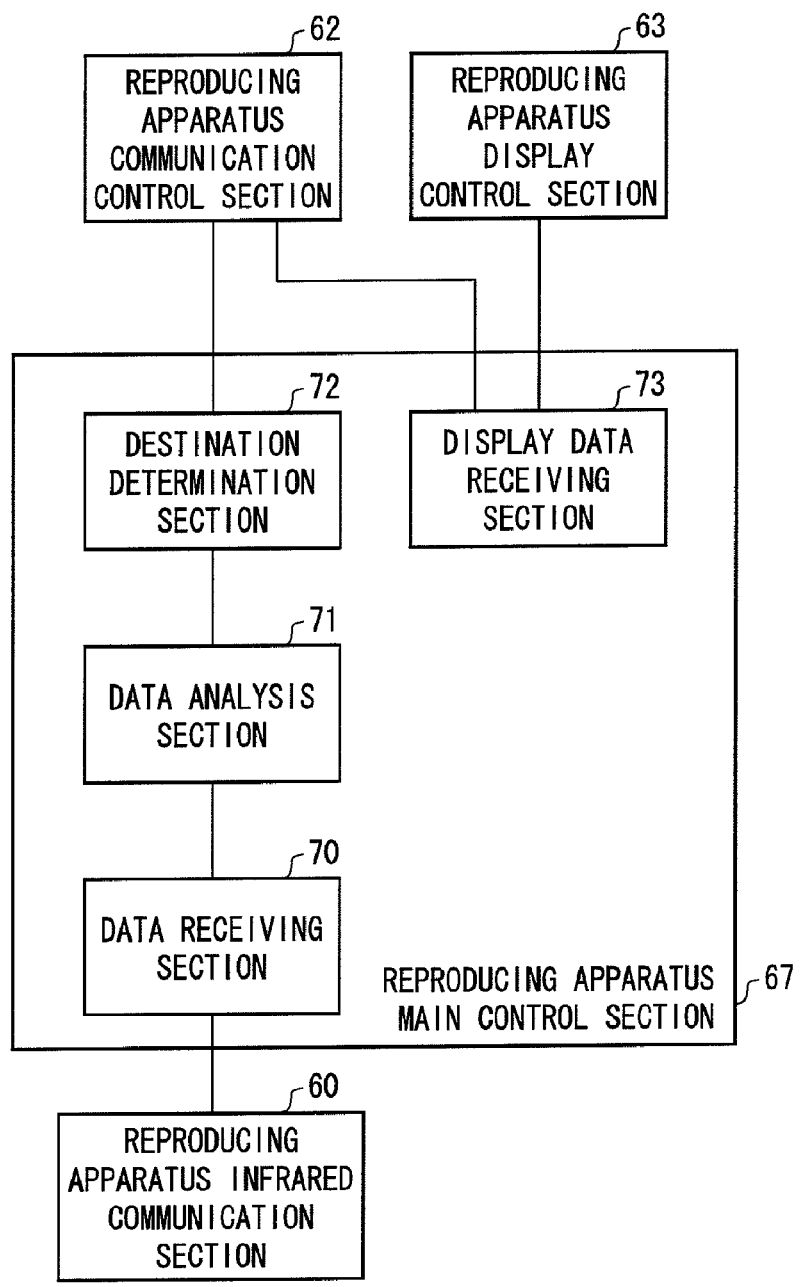
FIG. 9

The following description discusses, with reference to FIG. 9, a software structure of the reproducing apparatus 2 having the above hardware structure. FIG. 9 is a block diagram illustrating the software structure of the reproducing apparatus 2.

As illustrated in FIG. 9, the reproducing apparatus main control section 67 of the reproducing apparatus 2 includes, as functional blocks, a data receiving section (first receiving means) 70, a data analysis section (checking means) 71, a destination determination section (first transmitting means) 72, and a display data receiving section 73.

The data receiving section 70 receives the transmission data 101 received via the reproducing apparatus infrared communication section 60. More specifically, the reproducing apparatus infrared communication section 60 receives the transmission data 101 that is transmitted, in the form of image data, from the portable communication apparatus 1. Then, the reproducing apparatus infrared communication section 60 converts the transmission data 101 into a format that is supported by the reproducing apparatus 2. The transmission data 101 thus converted is then transmitted to the data receiving section 70. The data receiving section 70 instructs the data analysis section 71 to check information included in the transmission data 101. The data receiving section 70 and the reproducing apparatus infrared communication section 60 realize first receiving means of the present invention.

The data analysis section 71 checks the information included in the transmission data 101 in response to the instruction from the data receiving section 70. More specifically, the data analysis section 71 performs the checking in the following manner. As described earlier, the identification information 40 and the transmission-instruction time 50, to which the electronic signature is attached, are stored in the MakerNote area 521 in the EXIF region 520 of the transmission data 101. In addition, URL information included in the invitation information 51 is also stored in the MakerNote area 521. The data analysis section 71 checks whether or not these pieces of information are stored in the MakerNote area 521, and then instructs the destination determination section 72 to make a request for access to the WEB site 54 specified by the above URL. In the meantime, the data analysis section 71 supplies, to the destination determination section 72, the pieces of information thus checked, i.e., (i) the identification information 40 and the transmission-instruction time 50, to which the electronic signature is attached, and (ii) the invitation information 51. Then, the data analysis section 71 instructs the destination determination section 72 to make the request for access to the WEB site 54 and to transmit theses pieces of information to the service-providing server 3.

The destination determination section 72 determines a WEB site 54 to be accessed, based on the URL included in the invitation information 51 received from the data analysis section 71. In the meantime, the destination determination section 72 controls the reproducing apparatus communication control section 62 to transmit, to the service-providing server 3 that administrates the WEB site 54 to be accessed, the identification information 40, the transmission-instruction time 50, and the invitation information 51, which are received from the data analysis section 71. The destination determination section 72 and the reproducing apparatus communication section 62 realize first transmitting means of the present invention.

The display data receiving section 73 is arranged such that, when receiving data of the WEB site 54 via the reproducing apparatus communication control section 62, the display data receiving section 73 supplies the data to the reproducing apparatus display control section 63 and then instructs the reproducing apparatus display control section 63 to display the data.

(Arrangement of Service-Providing Server)

Figure 10:
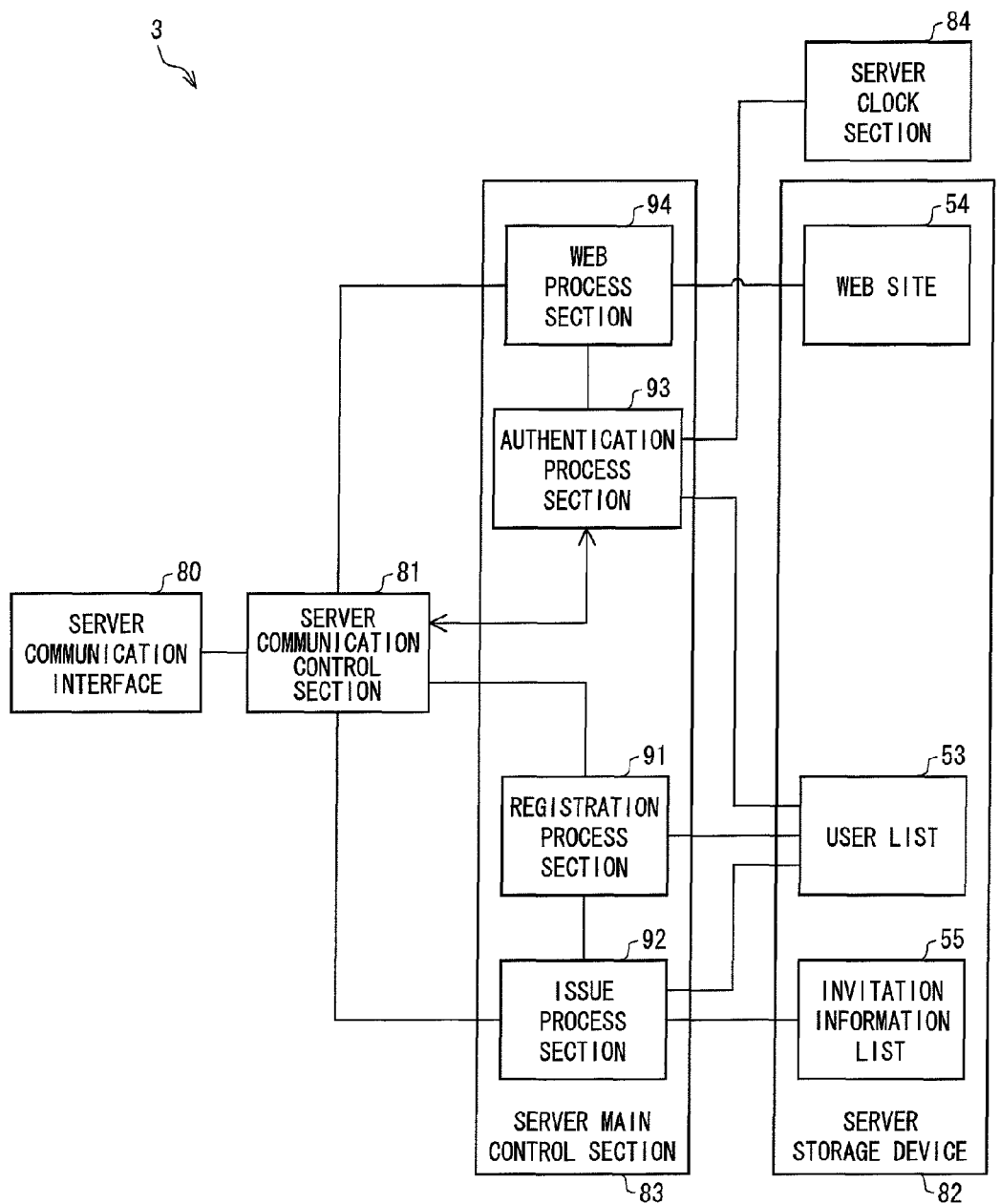
FIG. 10

The following description discusses an arrangement of the service-providing server 3 with reference to FIG. 10 through FIG. 12. FIG. 10 is a block diagram illustrating an arrangement of an essential part of the service-providing server 3 according to the embodiment of the present invention. The service-providing server 3 includes: a server communication interface 80 serving as an interface for communication with other apparatuses through a communications network; a server communication control section 81 that controls the server communication interface 80 so as to establish communication with other apparatuses; a server storage device (identification information storage device/content request information storage device) 82 that is a readable/writable recording medium; a server main control section 83 that controls every operation of each of the sections included in the service-providing server 3; and a server clock section (second clock section) 84 that measures a time in the service-providing server 3 at an intended timing.

In the server storage device 82 are stored (i) an invitation information list 55 in which a URL and a service ID of the WEB site 54 are listed, (ii) the WEB site 54 that is accessible only by an authentic user who presents the invitation information 51, and (iii) a user list (identification information) 53 of personal information of a user of the portable communication apparatus 1. The personal information in the user list 53 is registered when the user made a request for issue of the invitation information 51.

The invitation information list 55 manages the invitation information 51. As shown in FIG. 11, the invitation information list 55 contains, as the invitation information 51, (i) the service ID that identifies a service obtainable from the WEB site 54 and (ii) the URL of the WEB site 54, which are associated with each other.

The user list 53 manages information of the user who made an application for use of the invitation information 51. As shown in FIG. 12, in the user list 53 are stored, per portable communication apparatus 1 that made the application for the use of the service, (i) identification information of the portable communication apparatus 1, (ii) an e-mail address of the portable communication apparatus 1, (iii) a name of an owner of the portable communication apparatus 1, (iv) an address of the owner, and (v) a telephone number of the owner. Further, in the user list 53 is stored information indicative of transmission history of the invitation information 51 in association with these pieces of information thus stored. The information indicative of transmission history of the invitation information 51 is, for example, information indicative of a correlation between (a) the service ID that identifies a service to be provided based on the invitation information 51 and (b) transmission date and time of the invitation information 51. FIG. 11 is a view illustrating one exemplary invitation information list 55 according to the embodiment of the present invention. FIG. 12 is a view illustrating one exemplary user list 53 according to the embodiment of the present invention.

The server main control section 83 includes, as functional blocks, a registration process section 91; an issue process section 92; an authentication process section (judging means) 93; and a WEB process section (transmission determining means) 94. In a case where the server main control section 83 is realized, for example, by a CPU, the functional blocks are realized in such a manner that the CPU loads a program from a ROM (not illustrated) into a RAM (not illustrated) so as to execute the program.

The registration process section 91 updates the user list 53 in response to the application for use of the invitation information 51, which application is transmitted from the portable communication apparatus 1. After updating the user list 53, the registration process section 91 instructs the issue process section 92 to issue the invitation information 51.

In response to the instruction from the registration process section 91, the issue process section 92 transmits the invitation information 51 to the portable communication apparatus 1. The issue process section 92 selects, from the invitation information list 55, a piece of invitation information 51 to be transmitted, and then transmit the selected piece of invitation information 51 to the server communication control section 81. In the meantime, the issue process section 92 instructs the server communication control section 81 to transmit the selected piece of invitation information 51 to the portable communication apparatus 1. Further, the issue process section 92 stores, into the user list 53 as the invitation transmission history, (i) a service ID of the piece of invitation information 51 selected from the invitation information list 55 and (ii) issue date and time of the piece of invitation information 51.

The authentication process section 93 verifies whether or not the request for access to the WEB site 54 from the reproducing apparatus 2, is based on the request from the user who is permitted to use information of the WEB site 54. The verification is performed based on (i) the identification information 40 and the transmission-instruction time 50 to which the electronic signature is attached, and the invitation information 51, which are transmitted from the reproducing apparatus 2 that made the request for access to the WEB site 54, and (ii) a reception time point when the service-providing server 3 has received these pieces of information. If the authentication process section 93 judges that the request for access is based on the request from the user who is permitted to use the WEB site 54, then the authentication process section 93 instructs the WEB process section 94 to read out the information of the WEB site 54 from the server storage device 82 and then to transmit the information to the reproducing apparatus 2 by controlling the server communication section 81.

In response to the instruction from the authentication process section 93, the WEB process section 94 provides the information of the WEB site 54 to the reproducing apparatus 2. Specifically, in response to the instruction from the authentication process section 93, the WEB process section 94 reads out the information of the WEB site 54 from the server storage device 82. Then, the WEB process section 94 transmits the information of the WEB site 54 to the reproducing apparatus 2 by controlling the server communication section 81.

(Preprocessing of Service-providing Process)

The information distribution system (content distribution system) 100 according to the present embodiment is configured to execute a service-providing process such that the portable communication apparatus 1 transmits, to the reproducing apparatus 2, image data including invitation information 51, and with the use of the image data, the reproducing apparatus 2 accesses a WEB site 54 that is specified by the invitation information 51 included in the image data, so as to receive a service from the WEB site 54.

Figure 13:
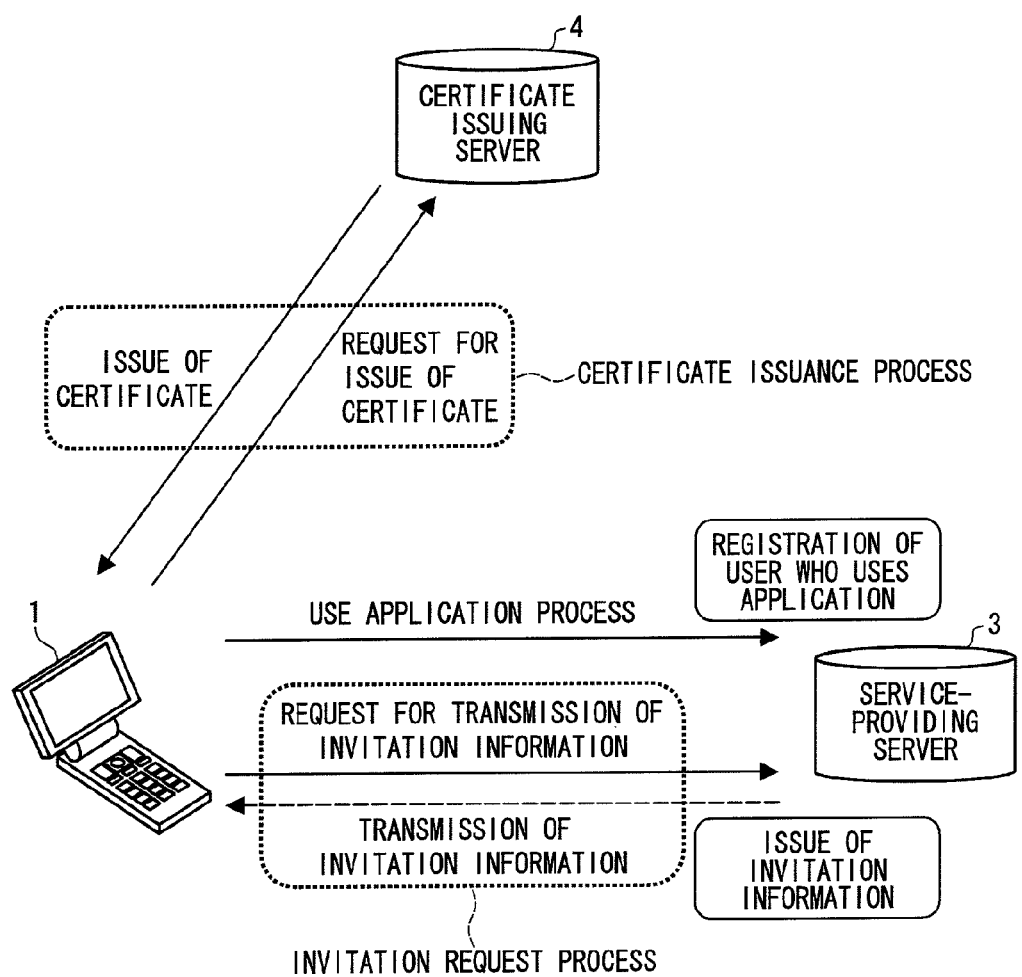
FIG. 13

Prior to the service-providing process, the portable communication apparatus 1 performs the following preprocessing (see FIG. 13). FIG. 13 is a view illustrating a flow of information related to preprocessing of the service-providing process in the information distribution system 100 according to the embodiment of the present invention.

First, the portable communication apparatus 1 performs a certificate issuance process, by which to request a certificate issuing server 4 to issue a certificate. Next, the portable communication apparatus 1 performs a use application process, by which to make an application for use of a service to be provided by the service-providing server 3. Then, the portable communication apparatus 1 performs a use application process, by which to make a request for use of the invitation information 51 that is required for receiving the service.

Specifically, the certificate issuance process is as follows. First, the portable communication apparatus 1 establishes communication with the certificate issuing server 4. Then, the portable communication apparatus 1 requests the certificate issuing server 4 to issue a certificate, so as to obtain the certificate issued by the certificate issuing server 4. The certificate thus issued includes a secret key, which is used when the portable communication apparatus 1 creates the electronic signature.

The use application process is as follows. In the portable communication apparatus 1, in response to a use application instruction given by a user via the operation section 25, the invitation information acquisition section 41 instructs the communication control section 29 to establish communication with the service-providing server 3. Then, the invitation information acquisition section 41 transmits, to the service-providing server 3, information of requesting permission for the use of the service to be provided by the service-providing server 3. The portable communication apparatus 1 is arranged such that at the time of transmitting the information for requesting permission for the use of the service, the invitation information acquisition section 41 also transmits the certificate issued as above together with the above information.

Further, the information distribution system 100 is arranged such that the user of the portable communication apparatus 1 is registered with the service-providing server 3. Specifically, in registering the user of the portable communication apparatus 1 with the service-providing server 3, the invitation information acquisition section 41 of the portable communication apparatus 1 transmits the following information to the service-providing server 3.

That is, the portable communication apparatus 1 transmits, to the service-providing server 3, (i) the identification information 40 acquired by the invitation information acquisition section 41 from the IC card 38 and (ii) an e-mail address that is allocated to the portable communication apparatus 1. At this time, the portable communication apparatus 1 may also transmit personal information such as a name of the owner (contractor) of the portable communication apparatus 1, an address of the owner, and/or telephone number of the owner. The personal information can be notified to the service-providing server 3, for example, in such a manner that an input format is received from the service-providing server 3 and the personal information is inputted thereinto via the operation section 25.

After the use application process is performed by the portable communication apparatus 1 that desires to receive the service, the service-providing server 3 stores, as the user list 53, the information (the identification information 40) supplied from the portable communication apparatus 1. Specifically, as described earlier, in the user list 53 are stored, per portable communication apparatus 1 that made the application for the use of the service, (i) the identification information 40 of the portable communication apparatus 1, (ii) the e-mail address, (iii) the name of the owner, (iv) the address of the owner, and (v) the telephone number of the owner. Further, in the user list 53 is stored the information indicative of the transmission history of the invitation information 51 in association with these pieces of information thus stored. The information indicative of the transmission history of the invitation information is, for example, information indicative of a correlation between (a) the service ID that identifies a service to be provided based on the invitation information 51 and (b) transmission date and time of the invitation information 51.

As described above, the service-providing server holds the user list 53. Accordingly, when the service-providing server 3 receives the request for access that is made for receiving the service, the service-providing server 3 can check whether or not the request for access is from the user who has already made the application for the use, based on the identification information 40 of the user, which is transmitted together with the request for access.

Further, in the user list 53 is also stored the transmission history of the invitation information 51, in association with the identification information 40 and the like information. Therefore, the service-proving server 3 is capable of knowing when and which piece of invitation information 51 is transmitted to a user of which portable communication apparatus 1. Accordingly, the service-providing server 3 is capable of preventing that an identical piece of invitation information 51 is transmitted twice or more times to an identical portable communication apparatus 1. Further, the service-providing server 3 is capable of selectively transmitting a URL of a WEB site 54 that provides a service conforming to preference of the user of the portable communication apparatus 1.

Subsequently, the invitation application process in which the portable communication apparatus 1 makes a request for the invitation information 51 to the service-providing server 3 is performed in the following manner. First, the portable communication apparatus 1 establishes communication with the service-providing server 3. Next, the portable communication apparatus 1 transmits, together with a user certificate, instruction information (invitation information transmission request) for requesting transmission of the invitation information 51. In response to the invitation information transmission request transmitted from the portable communication apparatus 1, the service-providing server 3 checks whether or not the user of the portable communication apparatus 1 that is a sender of the invitation information transmission request, is registered in the user list. In a case where the service-providing server 3 judges that the user is registered in the user list, the service-providing server 3 permits issue of the invitation information 51 and then transmits the invitation information 51 to the portable communication apparatus 1. The portable communication apparatus 1 receives the invitation information 51 from the service-providing server 3, and then stores it in the second memory 34. The invitation information 51 transmitted from the service-providing server 3 to the portable communication apparatus 1 is in the form of image data that includes a URL of a specific WEB site 54.

Figure 14:
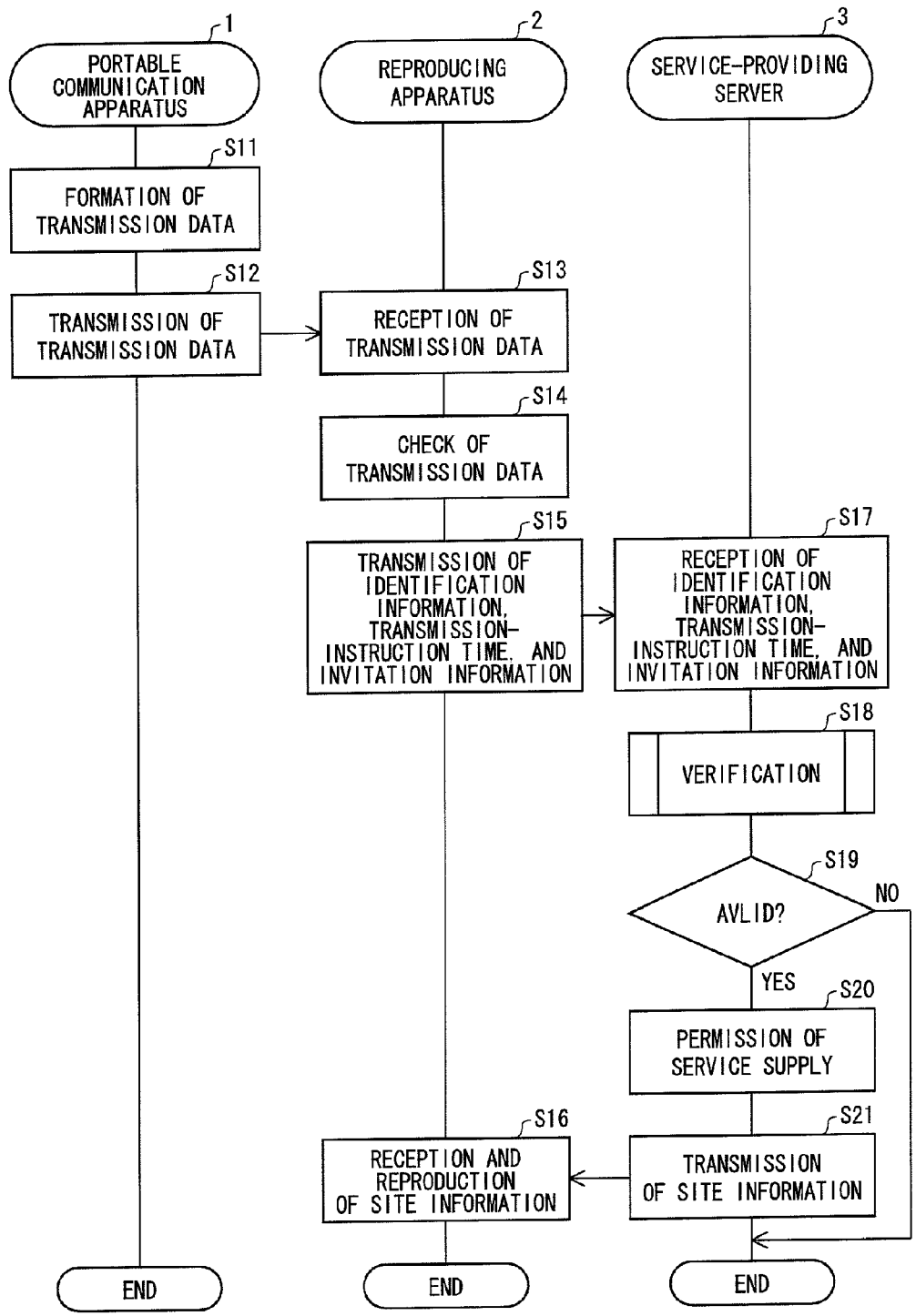
FIG. 14

The above descriptions dealt with the preprocessing of the service-providing process in the information distribution system 100 of the present embodiment. The following describes the service-providing process in the information distribution system 100 of the present embodiment, with reference to FIG. 14, on an assumption that the preprocessing has already been performed. FIG. 14 is a flowchart illustrating a process flow of a service-providing process in the information distribution system 100 according to the embodiment of the present invention.

(Service-Providing Process)

Initially, the portable communication apparatus forms the transmission data 101 for transmitting invitation information 51 to the reproducing apparatus (Step S11, hereinafter, just referred to as S11). Specifically, when the portable communication apparatus 1 receives invitation information 51 from the service-providing server 3, the operation section receives, from a user of the portable communication apparatus 1, instruction information indicative of an instruction to transmit the invitation information 51 to the reproducing apparatus 2. Then, the operation section 25 transmits the instruction information to the invitation information selection section 42.

Upon receiving the instruction information, the invitation information selection section 42 reads out the invitation information 51 from the second memory 34 and then transmits the invitation information 51 to the transmission data forming section 43. In a case where a plurality of pieces of invitation information 51 are stored in the second memory 34, a selection instruction on which piece of invitation information 51 is to be selected is inputted via the operation section 25. Accordingly, the invitation information selection section 42 can select and read out an intended piece of invitation information 51 from the second memory 34 based on the selection instruction thus inputted via the operation section 25. Note that the invitation information 51 is stored in the second memory 34 in such a manner that the invitation information 51 is recorded in a MakerNote area 521 of image data. The invitation information selection section 42 therefore reads out the whole image data.

Upon receiving the invitation information 51 from the invitation information selection section 42, the transmission data forming section 43 obtains, from the IC card 38, identification information 40 of the portable communication apparatus 1 via the IC card connection section 37. In the meantime, the transmission data forming section 43 instructs the clock section 36 to provide a current time, i.e., a transmission time point at which the invitation information 51 is to be transmitted from the portable communication apparatus 1. Then, the transmission data forming section 43 extracts a secret key from the user certificate that is issued in the above "Preprocessing of Service-providing Process". The transmission data forming section 43 then generates a hash value based on the identification information 40 and the transmission time point. Thereafter, the transmission data forming section 43 encrypts the hash value with the use of the secret key so as to create an electronic signature.

Then, the transmission data forming section 43 further stores, into the MakerNote area 521 of the image data, the identification information 40 and the transmission-instruction time 50, to which the electronic signature is attached. In this way, the transmission data 101 to be transmitted to the reproducing apparatus 2 is formed. After forming the transmission data 101, the transmission data forming section 43 supplies the transmission data 101 to the invitation information transmission section 44 and instructs the invitation information transmission section 44 to transmit the transmission data 101 with respect to the reproducing apparatus 2.

The invitation information transmission section 44 converts, in response to the instruction from the transmission data forming section 43, the transmission data 101 into a format that is transmittable in accordance with IrSS. Then, the invitation information transmission section 44 controls the infrared communication section 27 to transmit the transmission data 101 to the reproducing apparatus 2 (S12).

Meanwhile, in the reproducing apparatus 2, the reproducing apparatus infrared communication section receives the transmission data 101 thus transmitted from the portable communication apparatus 1 (S13). The reproducing apparatus infrared communication section 60 then supplies the transmission data 101 to the data receiving section 70. Upon receiving the transmission data 101 from the portable communication apparatus 1 via the reproducing apparatus infrared communication section 60, the data receiving section 70 instructs the data analysis section 71 to analyze the transmission data 101.

In response to the instruction from the data receiving section 70, the data analysis section 71 checks information stored in the MakerNote area 521 of the transmission data 101 (S14). Specifically, the data analysis section 71 checks whether or not in the MakerNote area 521 in the transmission data 101 are stored (i) the URL of the specific WEB site 54, as the invitation information 51, and (ii) the invitation information 40 and the transmission-instruction time 50, to which the electronic signature is attached. The URL is not the one that can be commonly used, but the one to which specific additional information is added so as to make the URL unique.

When the data analysis section 71 determines that the transmission data 101 received from the portable communication apparatus 1 includes the URL, the identification information 40, and the transmission-instruction time 50, then the data analysis section 71 instructs the destination determination section 72 to access the URL. In the meantime, the data analysis section 71 instructs the destination determination section 72 to transmit (i) the identification information 40 and the transmission-instruction time 50, to which the electronic signature is attached, and (ii) the invitation information 51.

In response to the instruction from the data analysis section 71, the destination determination section 72 instructs the reproducing apparatus communication control section 62 to establish communication with a site specified by the URL. In response to the instruction form the destination determination section 72, the reproducing apparatus communication control section 62 accesses the site via the communication interface 61, and then transmits (i) the identification information 40 and the transmission-instruction time 50, to which the electronic signature is attached, and (ii) the invitation information 51 (S15).

It should be noted that, if the URL includes additional information that specifies a service ID, then the URL including the additional information may be transmitted instead of the invitation information 51.

Meanwhile, in the service-providing server 3, the server communication control section 81 receives, from the reproducing apparatus 2 via the server communication interface 80, (i) the identification information 40 and the transmission-instruction time 50, to which the electronic signature is attached, and (ii) the invitation information 51 (S17). Then, the server communication control section 81 transmits theses pieces of information to the authentication process section 93.

After receiving, from the server communication control section 81, (i) the identification information 40 and the transmission-instruction time 50, to which the electronic signature is attached, and (ii) the invitation information 51, the authentication process section 93 verifies, based on these pieces of information, whether or not the request for access to the WEB site 54 is based on the instruction from the user registered in the use list 53 (S18). The process of the verification is described later in detail.

When it is verified, in the verification, that the user who made the request for access to the WEB site 54 is registered in the user list 53 and, accordingly, the authentication process section 93 determines that the user is authentic as a destination to which a service of the WEB site 54 is to be provided, based on the identification information 40 and the transmission-instruction time 50 ("YES" in S19), then the authentication process section 93 permits providing a service to an apparatus (the reproducing apparatus 2, in this case) which requested the access to the WEB site 54. That is, the authentication process section 93 permits providing the information of the WEB site 54 to the reproducing apparatus 2 (S20). Then, the authentication process section 93 sends the invitation information 51 to the WEB process section 94. On the other hand, if the authentication process section 93 determines that the user is not authentic ("NO" in S19), then the service-providing process is terminated here.

Upon receiving the invitation information 51 transmitted from the authentication process section 93, the WEB process section 94 reads out the information of the WEB site 54 based on the invitation information 51 and then transmits the information to the reproducing apparatus 2 (S21).

In the reproducing apparatus 2, upon receiving the information of the WEB site 54 transmitted from the service-providing server 3 via the reproducing apparatus communication control section 62, the display data receiving section 73 instructs the reproducing apparatus display control section 63 to perform displaying based on the information. In this way, the reproducing apparatus 2 can display the information of the WEB site 54, which is provided from the service-providing server 3, on the reproducing apparatus display section 64.

(Verification Process)

Figure 15:
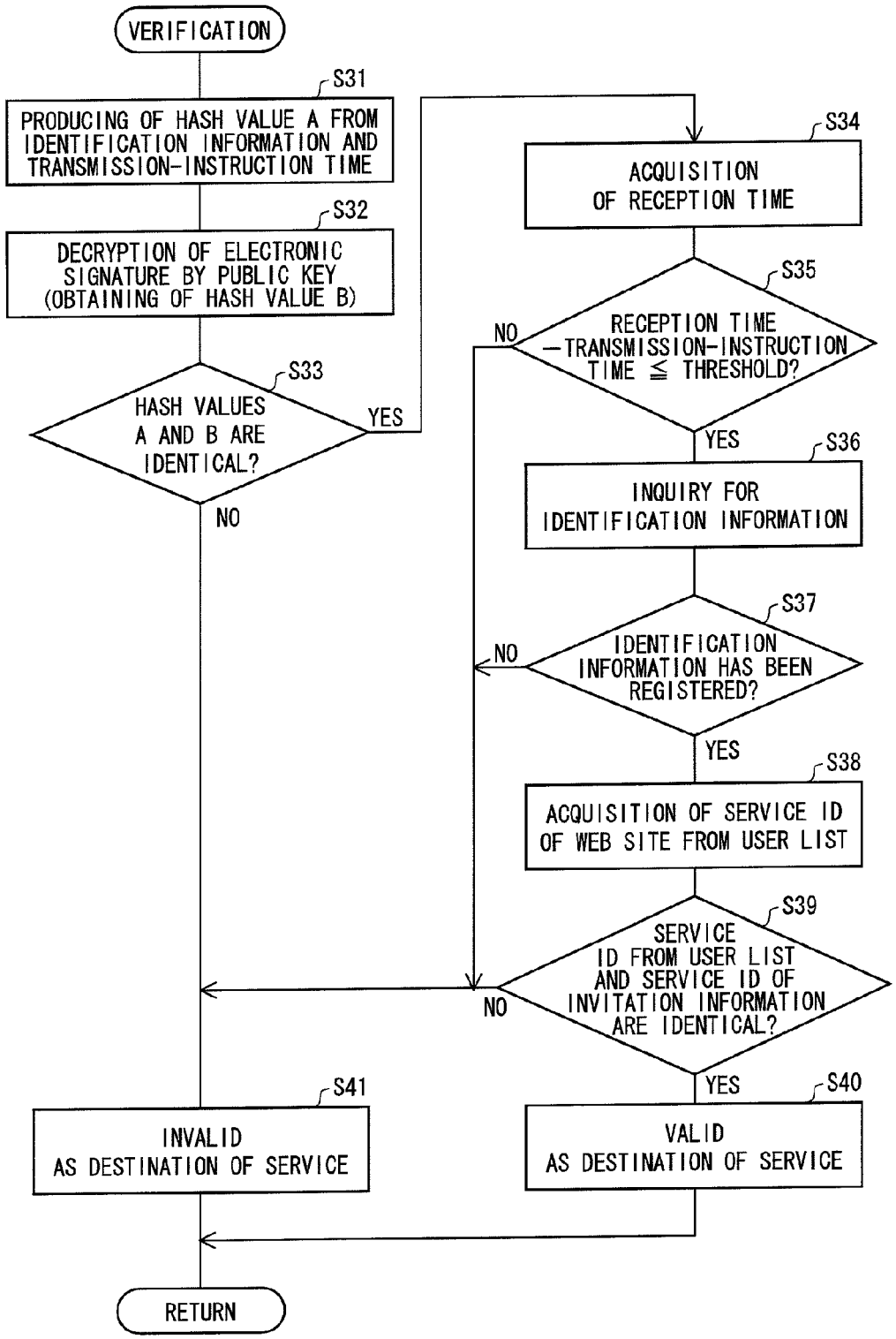
FIG. 15

The following describes the verification process in Step S18 more specifically, with reference to FIG. 15. FIG. 15 is a flowchart illustrating a process flow of the verification process in the service-providing server according to the embodiment of the present invention.

Initially, the authentication process section 93 produces a hash value (hash value A) from identification information 40 and the transmission-instruction time 50, which have been received from the reproducing apparatus 2 (S31). Then, the authentication process section 93 obtains a hash value (hash value B) by decrypting the electronic signature by use of a public key (S32). Subsequently, the authentication process section 93 compares the hash values A and B to find out whether or not these values are identical with each other (S33). In a case where these values are not identical with each other ("NO" in S33), the authentication process section 93 determines that the apparatus that requests access to the WEB site 54 is not valid (the apparatus is invalid) as a destination of the service (S41).

On the other hand, in a case of "YES" in Step S33, the authentication process section 93 inquires of the server clock section 84 for a reception time point, i.e., what time the identification information 40, the transmission-instruction time 50, and the invitation information 51 have been received, so as to obtain the reception time point (S34). When obtaining the reception time point, the authentication process section 93 calculates a difference between the reception time point and the received transmission-instruction time 50, and then finds out whether the difference between them is equal to or less than a threshold, or more than the threshold (10 seconds) (S35). In the case of the service-providing server 3 according to the present embodiment, the threshold is set to 10 seconds, but is not limited to this. The threshold is set appropriately in conformity to time necessary for information transmitted from the portable communication apparatus 1 to reach the service-providing server 3 via the reproducing apparatus 2.

In a case where the difference between the transmission-instruction time 50 and the reception time point is not equal to nor less than (i.e., more than) the threshold (10 seconds) ("NO" in Step S35), the authentication process section 93 judges that the apparatus that requests access to the WEB site 54 is not valid (the apparatus is invalid) as the destination of the service (S41).

On the other hand, in a case where the difference between the transmission-instruction time 50 and the reception time point is equal to or less than the threshold ("YES" in Step S35), the authentication process section 93 inquires for whether the received identification information 40 is listed in the user list 53 or not (S36). In a case where the identification information 40 is not registered in the user list 53 ("NO" in S37), the authentication process section 93 judges that the apparatus that requests access to the WEB site 54 is not valid (the apparatus is invalid) as the destination of the service (S41).

In a case where the identification information 40 is registered in the user list 53 ("YES" in S37), the authentication process section 93 acquires a service ID for the identification information 40 from the user list 53 (S38). Subsequently, the authentication process section 93 judges whether or not the service ID thus acquired is identical with a service ID included in the invitation information 51 received from the reproducing apparatus 2 (S39).

In a case where the service ID thus acquired is not identical with the service ID included in the invitation information 51 received from the reproducing apparatus 2 ("NO" in Step S39), the authentication process section 93 judges that the apparatus that requests access to the WEB site 54 is not valid (the apparatus is invalid) as the destination of the service (S41).

On the other hand, in a case where the service ID thus acquired is identical with the service ID included in the invitation information 51 received from the reproducing apparatus 2 ("YES" in Step S39), the authentication process section 93 judges that the apparatus that requests access to the WEB site is valid as the destination of the service (S40).

In Step S41, in the case where the authentication process section 93 judges that the apparatus that requests access to the WEB site 54 is not valid (the apparatus is invalid) as the destination of the service, the service-providing server 3 transmits, to at least either the reproducing apparatus or the portable communication apparatus 1, a notification that the reproducing apparatus 2 is invalid as the destination of the service. In response to the notification, the reproducing apparatus 2 or the portable communication apparatus 1 displays a dialogue of a comment indicative of disapproval of the use of the service, such as "the use of the service is not allowed".

As describe above, in the information distribution system 100 according to the present embodiment, the portable communication apparatus 1 is configured to transmit to the reproducing apparatus 2, not only the invitation information 51 but also the identification information 40 of the user of the portable communication apparatus 1 which identification information 40 has been registered in the service-providing server 3 in advance, and the transmission-instruction time 50 of the invitation information 51. Further, in the information distribution system 100 according to the present invention, the reproducing apparatus 2 is configured to transmit, to the service-providing server 3, the identification information 40 and transmission-instruction time 50 thus received, in order to access the URL included in the invitation information 51.

The above arrangement allows the service-providing server 3 to find out, based on the identification information 40, whether or not a request for access to the WEB site 54, received from the reproducing apparatus 2, is a request from a user who is permitted to use the WEB site 54. Further, the above arrangement allows the service-providing service 3 to judge, based on the transmission time point information, whether the identification information 40 transmitted from the reproducing apparatus 2 is the one eavesdropped during the communication or not.

In the information distribution system 100 according to the present embodiment, therefore, it is possible to check whether or not the reproducing apparatus 2 that has transmitted, to the service-providing server 3, the request for access to the WEB site 54, is an authentic information destination that is permitted to use the information of the WEB site 54. In addition, it is also possible to check whether the request for access to the WEB site 54 transmitted from the reproducing apparatus 2 to the service-providing server 3 is improperly made based on eavesdropped identification information 40 or not.

Moreover, the service-providing server 3 is arranged such that the authentication process section 93 judges validity of a destination of a service based on whether or not a service ID acquired from the user list 53 is identical with a service ID included in the invitation information 51 received from the reproducing apparatus 2. The service ID acquired from the user list 53 corresponds to the identification information 40 whose authenticity has been confirmed. Consequently, in the information distribution system 100 according to the present embodiment, it is possible to check authenticity of the invitation information 51 received from the reproducing apparatus 2.

Further, there is a possibility that the invitation information 51 may be eavesdropped between the service-providing server 3 and the portable communication apparatus 1. However, since it is possible to verify the authenticity of the invitation information 51 as such, the information distribution system 100 according to the present embodiment can take measures to improper acquisition of the invitation information 51 between them.

Further, the invitation information 51, the identification information 40, and the transmission-instruction time 50 are recorded in image data. Therefore, even in a case where the image data is eavesdropped, the presence of the invitation information 51, the identification information 40, and the transmission-instruction time 50 which are recorded in the image data may not be recognized. Therefore, it is possible to reduce such a possibility that these pieces of information are used improperly when these pieces of information are eavesdropped by eavesdropping, as compared to a case of transmitting the invitation information 51, the identification information 40, and the transmission-instruction time 50 directly.

There are several variations of the information distribution system 100 having the above arrangement, within its applicability, as described in Examples 1 through 3 as below. The following describes Examples 1 through 3.

EXAMPLE 1

In the aforementioned information distribution system 100, the portable communication apparatus 1 acquires invitation information 51 by requesting the service-providing server 3 to issue the invitation information 51. The portable communication apparatus 1 then transmits the acquired invitation information 51 to the reproducing apparatus 2. Subsequently, the reproducing apparatus 2 makes a request for access to a URL included in the invitation information 51.

Figure 16:
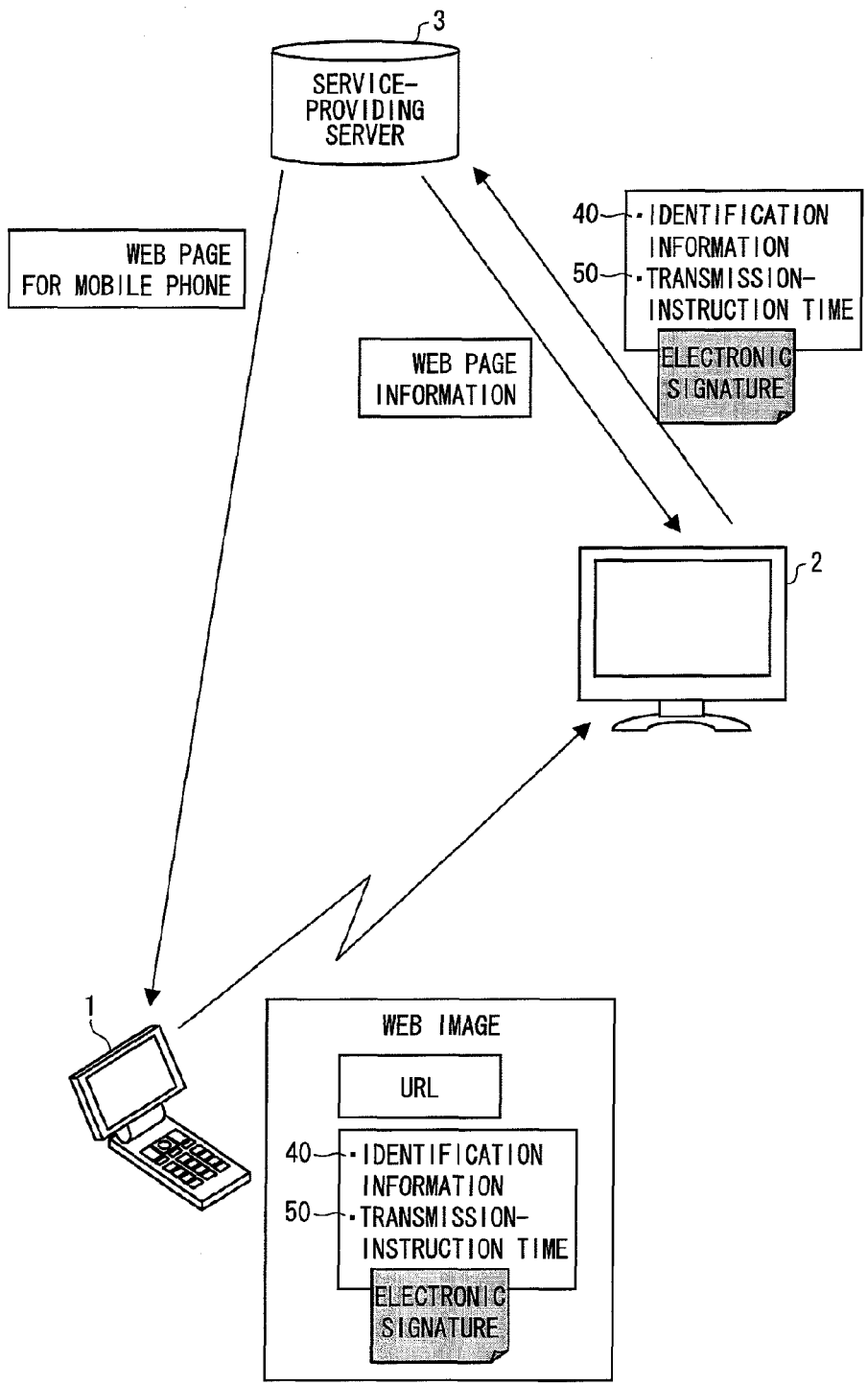
FIG. 16

In addition to that, such an arrangement as illustrated in FIG. 16 is also possible that the service-providing server 3 is caused to transmit, to the reproducing apparatus 2, an image of a WEB site 54 that is browsed on the portable communication apparatus 1, so that the reproducing apparatus 2 can also display the image thereon. FIG. 16 is a view schematically illustrating an arrangement of the information distribution system 100 according to Example 1 of the embodiment of the present invention.

It should be noted that the portable communication apparatus 1 has performed the above-mentioned "Preprocessing of Service-providing Process", in this example, too.

More specifically, as illustrated in FIG. 16, the portable communication apparatus 1 acquires a URL of a WEB site 54 while the WEB site 54 distributed from the service-providing server 3 is being browsed on the portable communication apparatus 1. That is, while the portable communication apparatus 1 is browsing thereon the WEB site 54 managed by the service-providing server 3, by establishing a connection to the service-providing server 3, the operation section 25 receives an acquisition instruction for acquiring the URL. In response to the acquisition instruction, the invitation information acquisition section 41 acquires the URL of the WEB site 54 being browsed on the portable communication apparatus 1 and snapshot image data of the WEB site from the service-providing server 3 via the communication control section 29. After acquiring the URL and the snapshot image data as such, the invitation information acquisition section 41 stores these pieces of information into the second memory 34 as invitation information 51.

When the operation section 25 receives a transmission instruction for transmitting the invitation information 51 to the reproducing apparatus 2, the invitation information selection section 42 reads out, from the second memory, the URL and the snapshot image data, which are stored as the invitation information 51, and then transmits them to the transmission data forming section 43. The transmission data forming section 43 then stores the URL thus received from the invitation information selection section 42, into a MakerNote area 521 of the snapshot image data. Further, the transmission data forming section 43 forms an electronic signature by use of a secret key read from the user certificate 52, based on identification information 40 received from the IC card 38 via the IC card connection section 37 and a time (transmission-instruction time 50) obtained by inquiring of the clock section 36. Subsequently, the electronic signature thus formed is attached to the identification information 40 and the transmission-instruction time 50, and then these pieces of information are also stored into the MakerNote area 521. Thus, transmission data 101 is formed. After that, the transmission data 101 is supplied to the invitation information transmitting section 44, so that the invitation information transmitting section 44 transmits the transmission data 101 to the reproducing apparatus 2 via the infrared communication section 27.

Upon receiving the transmission data 101, the reproducing apparatus 2 establishes a connection to a site specified by the URL included in the transmission data 101, and then transmits the identification information and the transmission-instruction time 50, both contained in the transmission data 101, to the service-providing server 3. The transmission of information from the reproducing apparatus 2 to the service-providing server 3 is performed by the reproducing apparatus 2 similarly to the aforementioned "Service-providing Process", and therefore is not described here particularly.

The service-providing server 3 verifies whether the access from the reproducing apparatus 2 is requested from an authentic user or not, based on the identification information 40 and the transmission-instruction time 50, to which the electronic signature is attached and which have been transmitted from the reproducing apparatus 2. The verification is performed in almost the same manner as the "Verification Process" described above. That is, the verification process in this example performs Step to Step S37 illustrated in FIG. 15 except the following point: in the verification process in this example, in a case of "YES" in Step S37, the process proceeds not to Step S38 but to S40. The verification process is not described here further.

When the service-providing server 3 judges, in this verification process, that the access from the reproducing apparatus 2 is requested from an authentic user, the service-providing server 3 modifies image data of the WEB site 54, which is specified by the URL, into image data that can be preferably displayed on the reproducing apparatus display section 64, and then transmits the image data thus modified to the reproducing apparatus 2.

As such, in the information distribution system 100, the portable communication apparatus 1 transmits the transmission data 101 to the reproducing apparatus 2, and accordingly, an image of the WEB site 54 that is displayed on a small display screen of the portable communication apparatus 1 can be displayed on a large display screen of the reproducing apparatus display section 64.

The above arrangement is such that the portable communication apparatus 1 forms invitation information 51 from a URL of the WEB site 54 that is being browsed and the snapshot image data of the WEB site 54. However, such an arrangement is also possible that instead of the snapshot image data, a piece of image data is selected from among pieces of image data included in the WEB site 54 that is being browsed, so as to form the invitation information 51 from the selected piece of image data and the URL.

EXAMPLE 2

Figure 17:
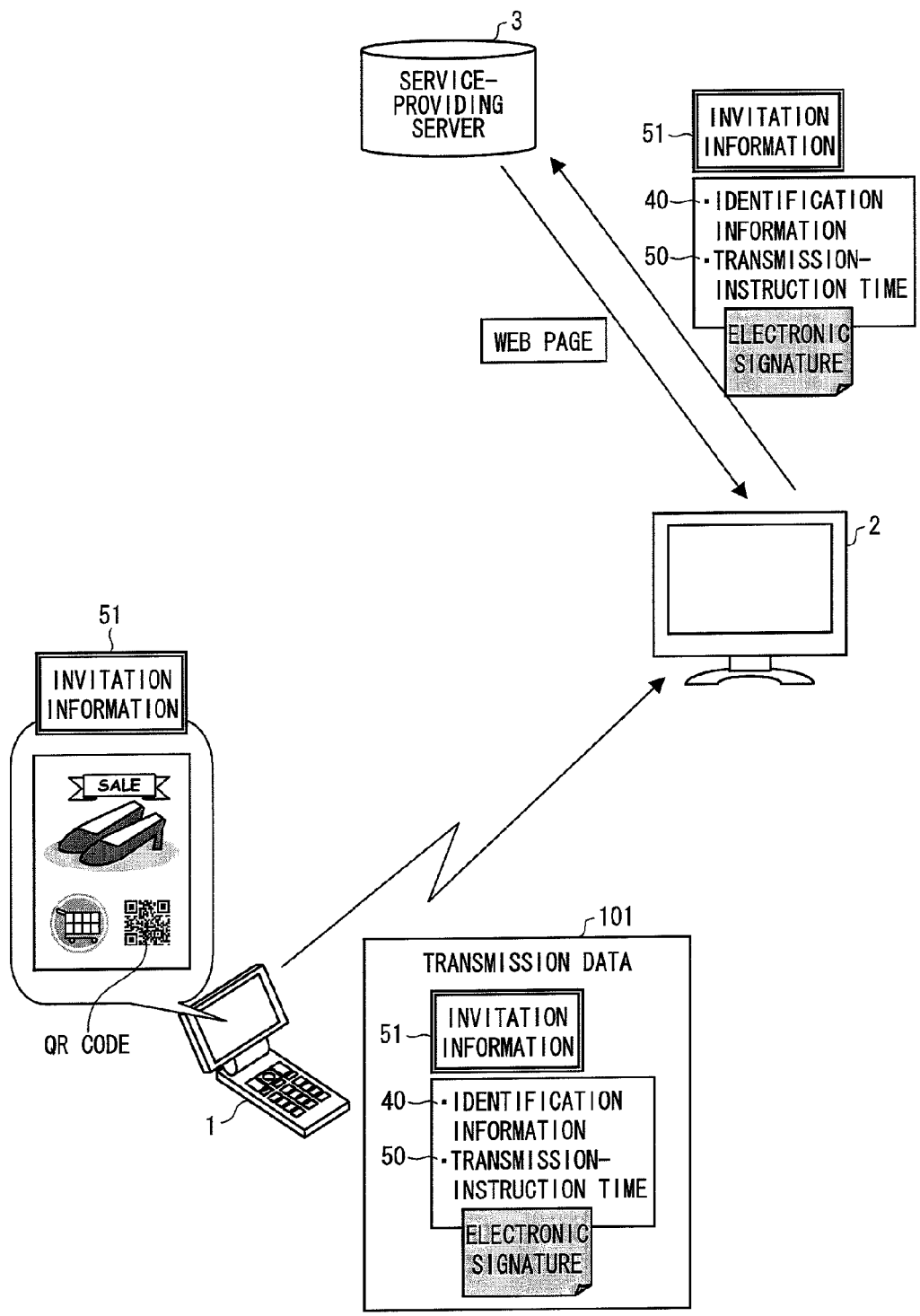
FIG. 17

The information distribution system 100 may be also arranged such that the portable communication apparatus 1 does not acquire the invitation information 51 from the service-providing server 3, but alternatively acquires the invitation information 51 in such a manner that, as illustrated in FIG. 17, (i) a two-dimensional barcode (e.g., QR code) printed on advertisement paper or the like is captured and (ii) the invitation information 51 is acquired from the captured image. FIG. 17 is a view schematically illustrating an arrangement of the information distribution system 100 according to Example 2 of the embodiment of the present invention.

It is assumed that the "Preprocessing of Service-providing Process" has been performed in advance, in this example, too.

When the operation section 25 receives an acquisition instruction for acquiring invitation information 51, the invitation information acquisition section 41 instructs the image processing section 31 to activate the image capture section 26 to obtain image data of a portion where the two-dimensional barcode is printed. The invitation information acquisition section 41 then acquires the image data thus obtained by the image capture section 26 via the image processing section 31. Subsequently, the invitation information acquisition section 41 analyzes the image data thus acquired so as to obtain a URL of a WEB site 54. Then, the invitation information acquisition section 41 stores the URL thus obtained into the second memory 34 as invitation information 51. Further, the invitation information acquisition section 41 stores the image data of the two-dimensional barcode thus captured by the image capture section 26 in association with the URL.

After that, when the operation section 25 receives a transmission instruction for transmitting the invitation information 51 to the reproducing apparatus 2, the invitation information selection section 42 reads out the invitation information (URL) and the image data of the two-dimensional code from the second memory 34, and then transmits them to the transmission data forming section 43. Upon receiving them, the transmission data forming section stores the invitation information 51 into a MakerNote area 521 of the image data of the two-dimensional code. Further, the transmission data forming section 43 receives identification information 40 via the IC card connection section 37 and acquires time information (transmission-instruction time 50) indicative of the transmission-instruction time by inquiring of the clock section 36, so that the transmission data forming section 43 creates an electronic signature by use of a secret key read out from the user certificate 52, based on the identification information 40 and the time information. Subsequently, the electronic signature thus formed is attached to the identification information 40 and the transmission-instruction time 50, and then these pieces of information are stored in the MakerNote area 521 of the image data of the two-dimensional code. Thus, transmission data 101 is formed. After that, the transmission data forming section 43 supplies the transmission data 101 to the invitation information transmitting section 44, so that the invitation information transmitting section 44 transmits the transmission data 101 to the reproducing apparatus 2 via the infrared communication section 27.

Subsequent processing performed in the reproducing apparatus 2 and the service-providing server 3 is the same as the aforementioned service-providing process and verification process, and therefore is not described here.

This example is arranged such that (a) the invitation information 51, and (b) the identification information 40 and the transmission-instruction time 50, to which the electronic signature is attached, are stored in the MakerNote area 521 of the image data of the two-dimensional barcode. However, the arrangement of the information distribution system 100 is not limited to this. Instead of the image data of the two-dimensional barcode, image data of a picture printed with the two-dimensional barcode or image data of an arbitrary picture taken by a user may be also used.

EXAMPLE 3

Instead of Example 2 in which the invitation information (URL) 51 is obtained from the two-dimensional code, the information distribution system 100 may be arranged such that at the time of making payment by the contactless IC 45 included in the portable communication apparatus 1, the invitation information 51 can be received from the reader/writer as well as various pieces of information related to the payment. In this arrangement, as described in the "Preprocessing of Service-providing Process", the user of the portable communication apparatus 1 has performed a use application process with respect to the service-providing server 3, in advance.

Figure 18:
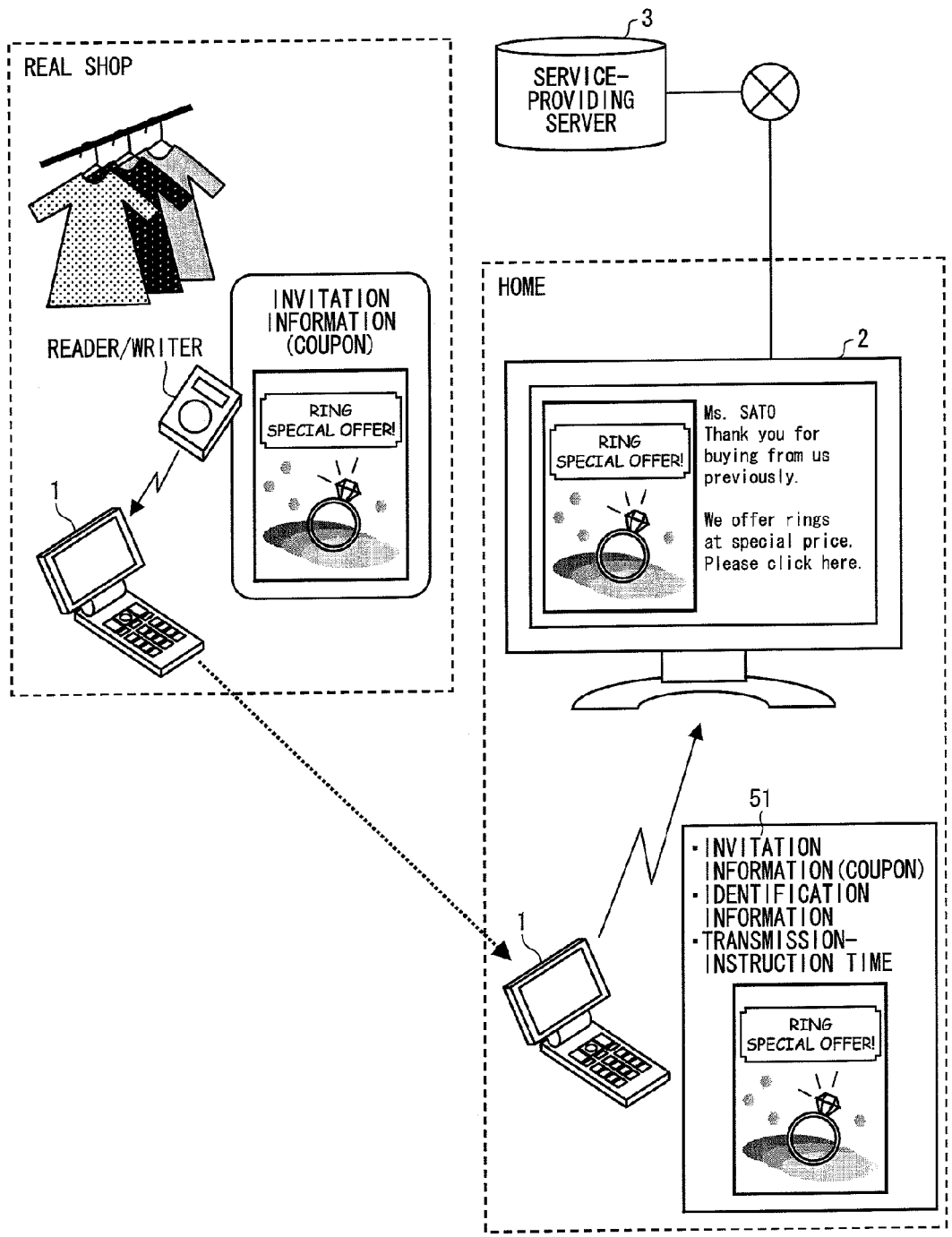
FIG. 18

That is, as illustrated in FIG. 18, the user of the portable communication apparatus 1 visits a real shop and purchases a product. At the time of purchasing the product, the user pays for the product by use of a payment function of the portable communication apparatus 1. When the payment function is executed, the portable communication apparatus 1 obtains, from the reader/writer, a coupon (invitation information 51) that can be used for shopping at a virtual shop established on the Internet. FIG. 18 is a view illustrating an arrangement of the information distribution system 100 according to Example 3 of the embodiment of the present invention.

Figure 19:
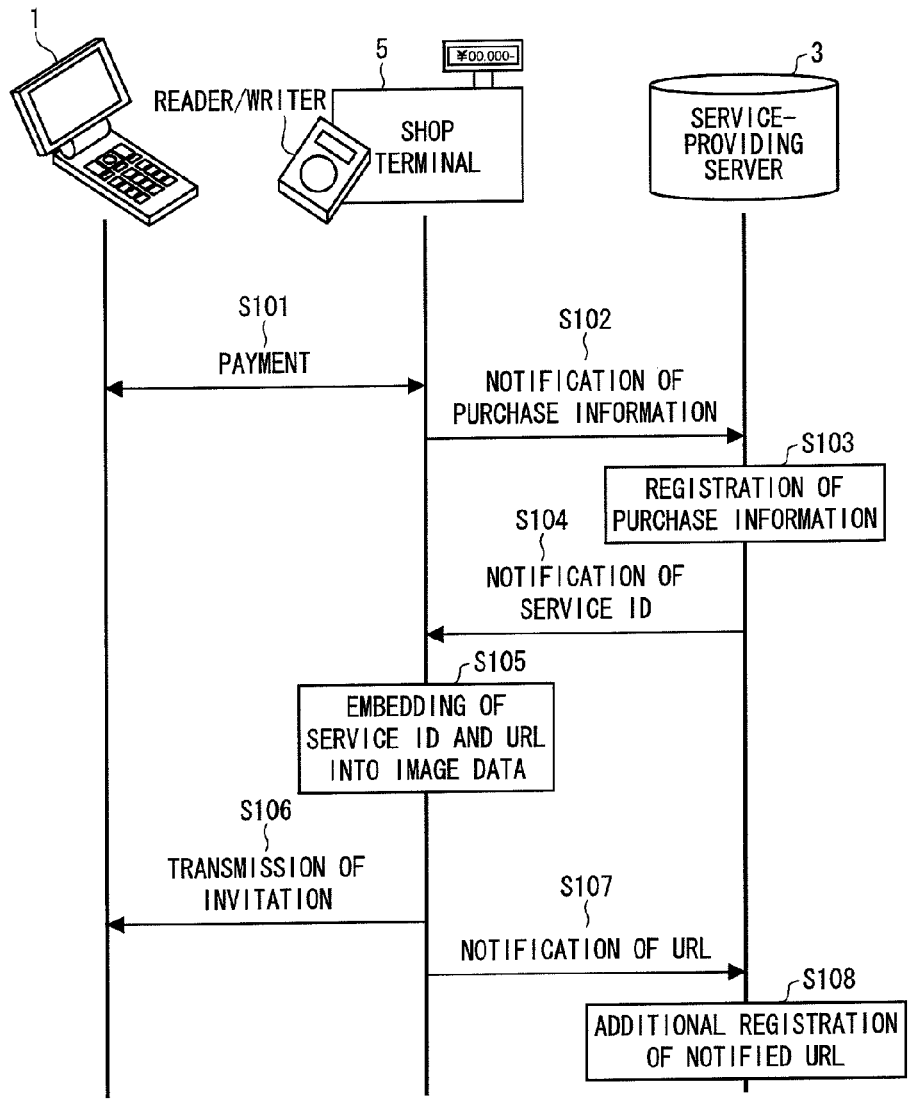
FIG. 19

More specifically, as illustrated in FIG. 19, in coupon acquisition, various pieces of information are exchanged between the portable communication apparatus 1, a shop terminal 5 provided with a reader/writer, and the service-providing server 3 that administrates a virtual shop, as follows. FIG. 19 is a process flow diagram illustrating one example of a coupon (invitation information 51) acquisition process in the portable communication apparatus 1, according to Example 3 of the embodiment of the present invention.

Initially, when the user purchases a product, the user places the portable communication apparatus 1 in the vicinity of the reader/writer, so as to cause a payment process of paying for the product, to be performed between the portable communication apparatus 1 and the shop terminal 5 (S101). In the payment process, the shop terminal 5 acquires various pieces of information from the portable communication apparatus 1, and then transmits the various pieces of information thus acquired, to a payment process server of a payment facility (not shown).

Among the various pieces of information acquired from the portable communication apparatus 1, the shop terminal 5 transmits, to the service-providing server 3 that administrates the virtual shop, identification information 40 of the portable communication apparatus 1, a name (product code) of the product the user purchases, and payment time and date, as purchase information on the purchase by the user of the portable communication apparatus 1 (S102). The service-providing server 3 causes the registration process section 91 to assign an identifier (service ID) to the purchase information received from the shop terminal 5 and then to store the purchase information into the server storage device 82

(S103), and then causes the issue process section 92 to instruct the server communication control section 81 to transmit, to the shop terminal 5, the service ID thus assigned (S104).

The shop terminal 5 stores, into a MakerNote area 521 of image data, the service ID received from the service-providing server 3 and a URL of the virtual shop that the service-providing server administrates, as invitation information 51 (S105). Then, the shop terminal 5 transmits the image data (coupon) including the invitation information 51 to the portable communication apparatus 1 via the reader/writer (S106). Further, the shop terminal 5 notifies the service-providing server 3 of information on the URL provided to the portable communication apparatus 1 as the invitation information 51 (S107). When the registration process section 91 receives, via the server communication control section 81, the information on the URL provided from the shop terminal 5 to the portable communication apparatus 1, the service-providing server 3 stores the information on the URL into the server storage device 82 in association with the service ID assigned to the purchase information (S108).

Figure 20:
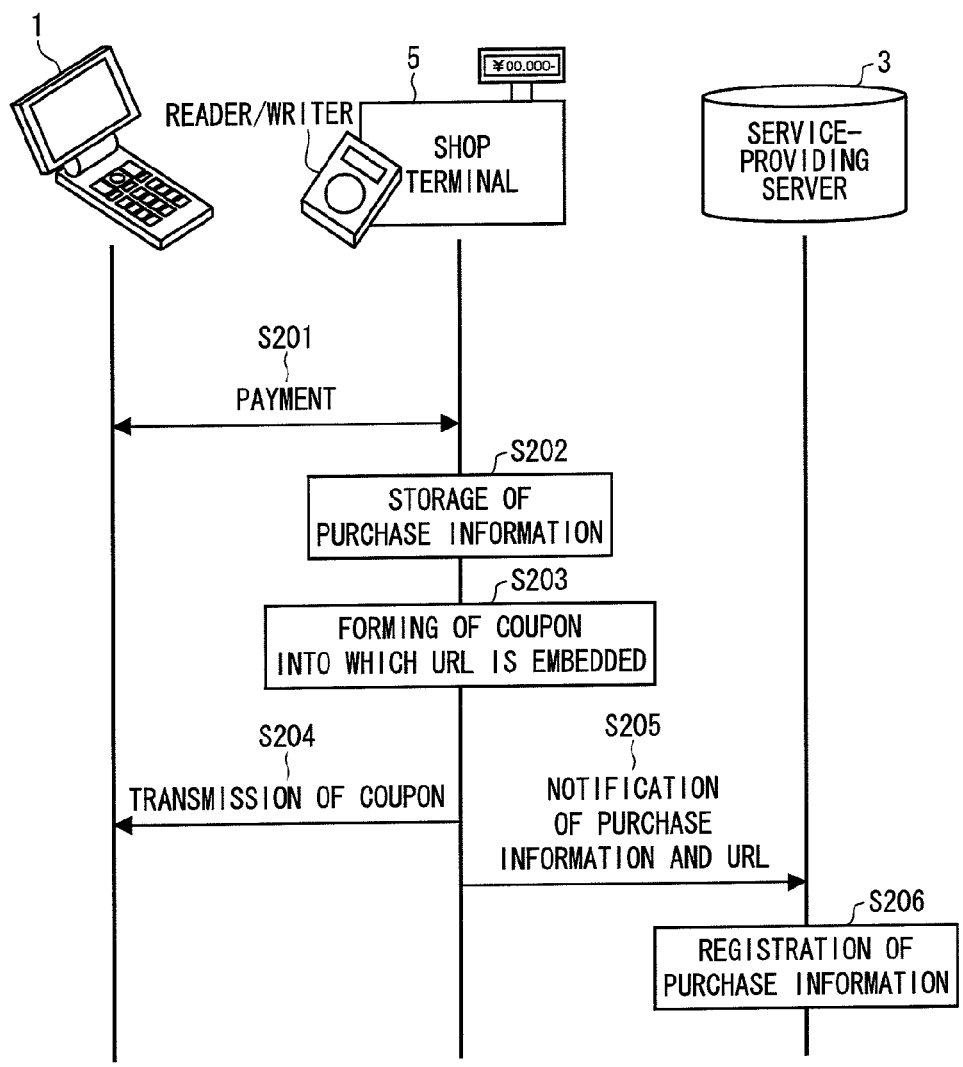
FIG. 20

In a case where it is not necessary to cause the service-providing server 3 to issue a service ID, it is also possible to arrange the information distribution system 100 such that, as illustrated in FIG. 20, after the payment process is performed between the portable communication apparatus and the shop terminal 5, the shop terminal 5 transmits the invitation information 51 to the portable communication apparatus 1. FIG. 20 is a process flow diagram illustrating one example of a coupon (invitation information 51) acquisition process in the portable communication apparatus 3, according to Example 3 of the embodiment of the present invention.

More specifically, similarly to Step S101, a payment process of paying for a product is performed between the portable communication apparatus 1 and the shop terminal 5 (S201). In the payment process, the shop terminal 5 acquires various pieces of information from the portable communication apparatus 1. Among these various pieces of information, the shop terminal 5 stores, into a storage device (not shown) provided in the shop terminal 5, identification information 40 of the portable communication apparatus 1, a name (product code) of the product the user purchases, and payment time and date, as purchase information (S202). In the meantime, the shop terminal 5 has stored, in advance, in the storage device, a URL of a virtual shop that is to be provided to the user of the portable communication apparatus 1. Upon receiving the purchase information from the portable communication apparatus 1, the shop terminal 5 forms a coupon in the form of image data into which the URL is stored (S203). After forming the coupon as such, the shop terminal 5 transmits the coupon to the portable communication apparatus 1 (S204). After transmitting the coupon as such, the shop terminal 5 transmits, to the service-providing server 3, the purchase information stored in the storage device and information on the URL transmitted to the portable communication apparatus 1 (S205).

Upon receiving the purchase information and the URL from the shop terminal 5, the service-providing server 3 stores them into the server storage device 82. Especially in regard to the information on the URL among the received pieces of information, the service-providing server 3 stores the information on the URL and the time and data when the coupon (the invitation information 51) has been transmitted to the portable communication apparatus 1, into an item of invitation transmission history in the user list 53.

As described above, in the case where the service ID assigned to the purchase information is not necessary to be contained in the invitation information 51, the information distribution system 100 may be arranged such that the invitation information 51 is transmitted from the shop terminal 5 to the portable communication apparatus 1, and then the purchase information and the like information are transmitted from the shop terminal 5 to the service-providing server 3.

Figure 21:
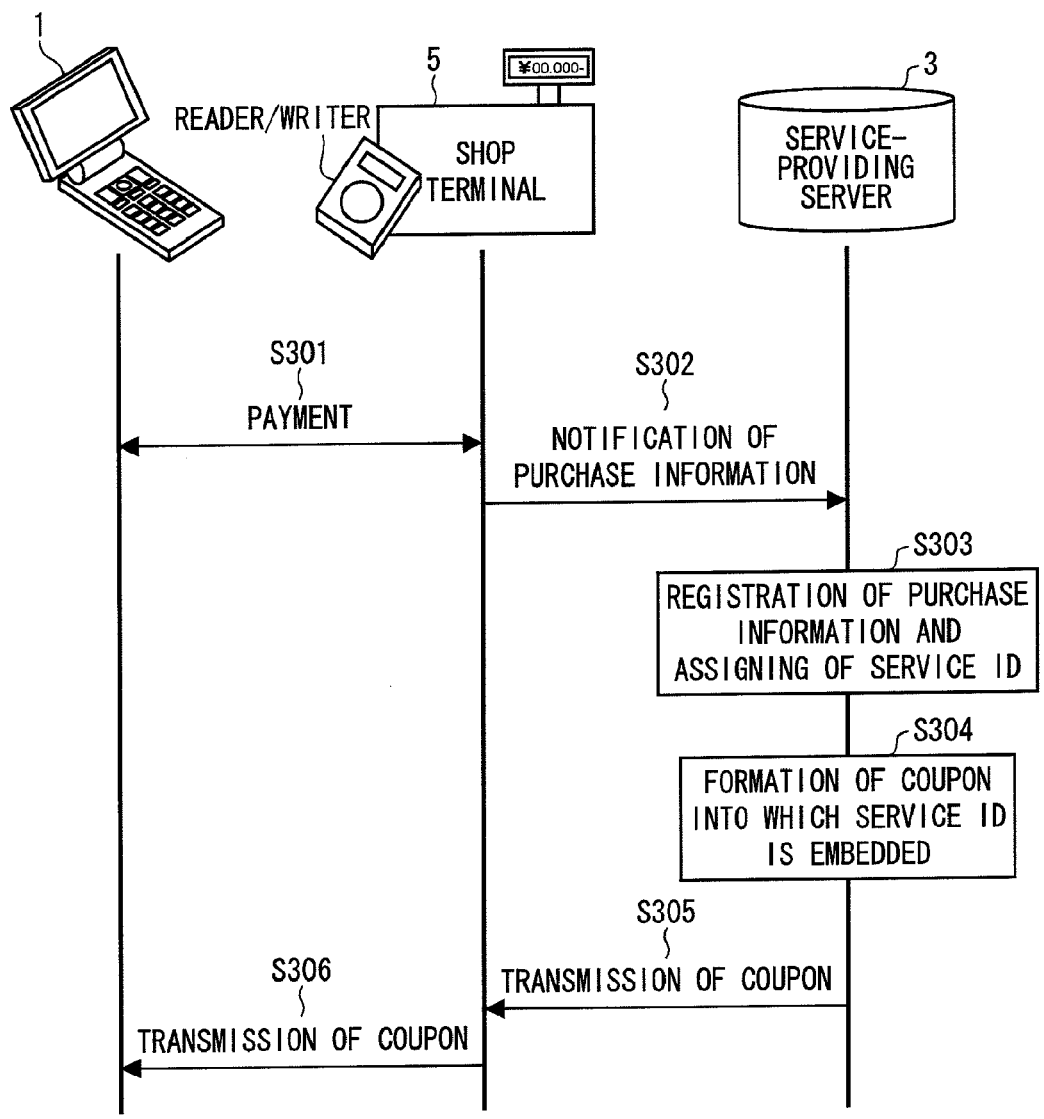
FIG. 21

How to acquire a coupon is not limited to the above arrangement, and the following arrangement is also possible. That is, as illustrated in FIG. 21, for example, a coupon is produced in the service-providing server 3, and the coupon is provided to the portable communication apparatus 1 via the shop terminal 5. FIG. 21 is a process flow diagram illustrating one example of a coupon (invitation information) acquisition process in the portable communication apparatus 1, according to Example 3 of the embodiment of the present invention.

As illustrated in FIG. 21, when the user purchases a product, the user places the portable communication apparatus 1 in the vicinity of the reader/writer, so as to cause a payment process of paying for the product, to be performed between the portable communication apparatus 1 and the shop terminal 5 (S301), in the similar manner as Step S101. In the payment process, the shop terminal 5 acquires various pieces of information from the portable communication apparatus 1, and then transmits the various pieces of information thus acquired, to a payment process server of a payment facility (not shown).

Among the various pieces of information acquired from the portable communication apparatus 1, the shop terminal 5 transmits, to the service-providing server 3 that administrates a virtual shop, identification information 40 of the portable communication apparatus 1, a name (product code) of the product the user purchases, and payment time and date, as purchase information (S302).

The service-providing server 3 causes the registration process section 91 to assign an identifier (service ID) to the purchase information received from the shop terminal 5 and then to store the purchase information into the server storage device 82 (S303). Subsequently, the service-providing server 3 causes the issue process section 92 to store the service ID and information on a URL into a MakerNote area 521 of image data, as invitation information 51. The issue process section 92 then transmits, as a coupon, the image data including the invitation information 51, to the shop terminal 5 (S305).

Upon receiving the coupon from the service-providing server 3, the shop terminal 5 transmits the coupon to the portable communication apparatus 1 via the reader/writer.

When the portable communication apparatus 1 receives the coupon as such, the user of the portable communication apparatus 1 goes home with the portable communication apparatus 1. At home, the user causes the portable communication apparatus 1 to transmit, to the reproducing apparatus 2 in accordance with IrSS, the coupon acquired at the real shop. The reproducing apparatus 2 that has received the coupon establishes a connection to the service-providing server 3 that administrates a virtual shop of the URL stored in the coupon so as to access the virtual shop. Then, the reproducing apparatus 2 receives information of a WEB site 54 of the virtual shop, from the service-providing server 3. The processes from a point where the reproducing apparatus 2 receives the coupon (invitation information 51) from the portable communication apparatus 1 until the reproducing apparatus 2 receives a service from the service-providing server 3 are the same as the aforementioned "Service-providing Process" and "Verification Process", and therefore are not described here.

The information distribution system 100 according to the present embodiment is arranged such that the reproducing apparatus 2 receives, from the service-providing server 3, information of a certain WEB site 54 as a service for supply. However, the information distribution system 100 may be arranged such that the service-providing server 3 holds content data, such as video data and music data, in a server storage device, and provides the content data to the reproducing apparatus 2.

Further, the portable communication apparatus 1 according to the present embodiment is arranged such that in response to a control instruction from the main control section 35, the portable communication apparatus 1 acquires a unique ID from the IC card 38 via the IC card connection section 37, as the identification information 40 of the portable communication apparatus 1. However, the identification information 40 may be information for identifying an owner of the portable communication apparatus 1. In such a case where the identification information 40 is information for identifying the owner of the portable communication apparatus 1, the identification information 40 may be inputted by a user via the operation section 25 and then stored in the second memory 34.

Furthermore, the portable communication apparatus 1 according to the present embodiment is arranged such that as described in the certificate issuance process, the portable communication apparatus 1 requests the certificate issuing server 4 for the issues of a certificate, so as to receive the certificate issued by the certificate issuing server 4. Further, the portable communication apparatus 1 according to the present embodiment is arranged such that since the certificate thus issued includes a secret key, the portable communication apparatus 1 can acquire the secret key by receiving the certificate.

However, how to acquire the secret key is not limited to the above arrangement, and the portable communication apparatus 1 may be arranged such that the secret key has been recorded in the IC card 38 in advance by factory default. In such an arrangement, the certificate issued from the certificate issuing server 4 to the portable communication apparatus 1 does not include the secret key.

Furthermore, the portable communication apparatus 1 may be arranged such that the certificate has been recorded in the IC card 38 in advance by factory default, similarly to the secret key. In such a case where the IC card 38 includes the certificate by default, the aforementioned certificate issuance process can be omitted.

As described above, the reproduction apparatus of the present invention, the portable communication apparatus of the present invention, the administrative server of the present invention, and the content distribution system of the present invention are arranged as follows.

As described above, a reproducing apparatus of the present invention is a reproducing apparatus for reproducing a content that is received from an administrative server that administrates the content, the administrative server holding identification information of a portable communication apparatus that is permitted to use the content or an owner of the portable communication apparatus who is permitted to use the content, and the administrative server providing the content in response to a request from a portable communication apparatus or an owner specified by the identification information. The reproducing apparatus of the present invention includes: first receiving means for receiving, from a portable communication apparatus, (a) content request information for requesting the administrative server to transmit the content, (b) identification information for identifying the portable communication apparatus or an owner of the portable communication apparatus, and (c) transmission time point information indicative of a point of time when the portable communication apparatus has transmitted the content request information; and first transmitting means for transmitting, to the administrative server, the content request information, the identification information, and the transmission time point information by establishing a connection to the administrative server based on the content request information received by the first receiving means.

As a result, the reproduction apparatus of the present invention yield such an effect that in a case where the reproducing apparatus receives, in response to content request information received from the portable communication apparatus, a content from the administrative server that administrates the content, the administrative server can check whether or not the reproducing apparatus is an authentic destination that is permitted to receive the content.

Further, in addition to the above arrangement, the reproducing apparatus of the present invention may be arranged such that: the first receiving means receives, from the portable communication apparatus, image data including the content request information, the identification information, and the transmission time point information; the content request information includes location information indicative of where the content managed by the administrative server is located; and the reproducing apparatus further includes checking means for checking the content request information, the identification information, and the transmission time point information, which are included in the image data, so as to obtain the location information from the content request information, the first transmitting means establishing a connection to the administrative server based on the location information thus obtained by the checking means.

With the above arrangement, since the reproducing apparatus of the present invention includes the checking means, the reproducing apparatus can determine a connection destination by obtaining location information from the content request information received from the portable communication apparatus.

In addition to the above arrangement, the reproducing apparatus of the present invention may be arranged such that: the identification information and the transmission time point information received by the first receiving means contain signature information that ensures authenticity of the identification information and the transmission time point information.

With the above arrangement, since signature information is attached to the identification information and the transmission time point information, it is possible to improve reliability of the identification information and the transmission time point information included in the transmission data.

A portable communication apparatus of the present invention is a portable communication apparatus whose identification information is registered in an administrative serve that administrates a content so that the administrative server identifies that the portable communication apparatus or an owner of the portable communication apparatus is permitted to use the content. The portable communication apparatus of the present invention includes: acquisition means for acquiring content request information for requesting the administrative server to transmit the content; an identification information storage device in which the identification information is stored; a first clock section for measuring a transmission time point that is a point of time at which to transmit the content request information acquired by the acquisition means, to a reproducing apparatus for reproducing the content; transmission data forming means for forming transmission data to be transmitted to the reproducing apparatus, based on the content request information acquired by the acquisition means, the identification information stored in the identification information storage device, and transmission time point information indicative of the transmission time point measured by the first clock section; and second transmitting means for transmitting, to the reproducing apparatus, the transmission data formed by the transmission data forming means.

As a result, the portable communication apparatus of the present invention yields such an effect that the content request information that is transmitted from the portable communication apparatus to the reproducing apparatus allows the administrative server to check whether or not the reproducing apparatus is an authentic destination that is permitted to receive a content from the administrative server that administrates the content.

In addition to the above arrangement, the portable communication apparatus of the present invention may be arranged such that the acquisition means requests the administrative server to transmit the content request information so as to acquire the content request information from the administrative server.

In addition to the above arrangement, the portable communication apparatus of the present invention may be arranged such that the content request information is recorded in a product as an identification code indicative of what information the content request information contains, and the portable communication apparatus of the present invention further includes an image acquisition section for acquiring image data of the identification code recorded in the product, the acquisition means analyzing the image data acquired by the image acquisition section so as to acquire the content request information.

The product may be, for example, a sheet of paper, a wall, a floor, or a daily commodity. That is, the product may be any medium on which an identification code can be printed. Further, the identification code may be, for example, a two-dimensional code, such as barcode or QR code.

In addition to the above arrangement, the portable communication apparatus of the present invention may be arranged such that the portable communication apparatus further includes an information acquisition section for acquiring the content request information by establishing wireless communication with a content request information holding device that holds the content request information therein, and the acquisition means acquires the content request information from the information acquisition section.

In addition to the above arrangement, the portable communication apparatus of the present invention may be arranged such that the transmission data forming means forms the transmission data by attaching, to at least the identification information and the transmission time point information, signature information that ensures authenticity of the identification information and the transmission time point information.

With the above arrangement, since the transmission data forming means attaches signature information to the identification information and the transmission time point information, it is possible to improve reliability of the identification information and transmission time point information included in the transmission data.

In addition to the above arrangement, the portable communication apparatus of the present invention may be arranged such that the transmission data forming means forms the transmission data by storing, into image data, the content request information, the identification information, and the transmission time point information, and the second transmitting means transmits, to the reproducing apparatus, the image data thus formed, as the transmission data, by the transmission data forming means.

In the above arrangement, the portable communication apparatus can transmit transmission data as image data to the reproducing apparatus. In a case where the portable communication apparatus receives, for example, image data in which the content request information is stored, the portable communication apparatus can further store, into the image data, the identification information and the transmission time point information, and then transmit, to the reproduction apparatus, these pieces of information in the form of the image data.

Further, since the content request information, the identification information, and the transmission time point information are stored in image data as such, even if the image data is eavesdropped, the presence of the content request information, the identification information, and the transmission time point information thus stored in the image data may not be recognized. Accordingly, as compared to a case where the content request information, the identification information, and the transmission time point information are transmitted as they are, it is possible to reduce a possibility that these pieces of information are improperly used by eavesdropping these pieces of information.

As described above, an administrative server of the present invention is an administrative server that administrates a content and includes: an identification information storage device in which to store identification information for identifying whether or not a portable communication apparatus or an owner of the portable communication apparatus is permitted to use the content; a second clock section for measuring reception time point information indicative of a point of time when the administrative server has received, from a reproducing apparatus for reproducing the content, (a) content request information for requesting transmission of the content, (b) identification information, and (c) transmission time point information indicative of a point of time when the portable communication apparatus has transmitted the content request information to the reproducing apparatus, in a case where the administrative server receives these pieces of information from the reproducing apparatus; judging means for judging authenticity of the content request information thus received, based on the identification information thus received and a difference between the transmission time point information and the reception time point information; and transmission determining means for determining a content to be transmitted to the reproducing apparatus, when the judging means judges that the content request information thus received is authentic, the judging means judging that the content request information thus received is authentic, when it is verified that the identification information thus received has been already stored in the identification information storage apparatus and the difference between the transmission time point information and the reception time point information is within a predetermined range.

The administrative server of the present invention yields such an effect that, in a case where the administrative server provides a content to a reproducing apparatus in response to content request information received from the reproducing apparatus, the administrative server can check whether or not the reproducing apparatus is an authentic destination to which the content is to be provided.

In addition to the above arrangement, the administrative server of the present invention may be arranged such that the administrative server further includes a content request information storage device in which to store content request information, the judging means judges that the content request information thus received is authentic, when it is verified that (i) the identification information thus received has been already stored in the identification information storage device, (ii) the difference between the transmission time point information and the reception time point information is within a predetermined range, and (iii) the content request information thus received has been already stored in the content request information storage device.

With the above arrangement, the judging means can verify authenticity of the content request information thus received, additionally based on whether or not the content request information thus received has been already stored in the content request information storage device.

Accordingly, with the above arrangement, the administrative server of the present invention can further accurately judge the authenticity of the received content request information.

In addition to the above arrangement, the administrative server of the present invention may be arranged such that the identification information thus received and the transmission time point information contain signature information that ensures authenticity of the identification information thus received and the transmission time point information, the signature information has been created by encrypting a hash value produced from the identification information and the transmission time point information, by use of a secret key included in the portable communication apparatus, and the judging means judges that the content request information thus received is authentic based on the identification information thus received and the difference between the transmission time point information and the reception time point information, when a hash value produced from the identification information thus received and the transmission time point information is identical with a hash value obtained by decrypting the signature information by a public key.

With the above arrangement, after the authenticity of signature information attached to the identification information and the transmission time point information is judged, it is possible to further judge the authenticity of the received content request information, based on the received identification information and the difference between the transmission time point information and the reception time point information.

As described above, a content distribution system of the present invention is a content distribution system includes: a reproducing apparatus; a portable communication apparatus; and an administrative server. The reproducing apparatus included in the content distribution system of the present invention is a reproducing apparatus for reproducing a content that is received from an administrative server that administrates the content, the administrative server holding identification information of a portable communication apparatus that is permitted to use the content or an owner of the portable communication apparatus who is permitted to use the content, and the administrative server providing the content in response to a request from a portable communication apparatus or an owner specified by the identification information, and the reproducing apparatus includes: first receiving means for receiving, from a portable communication apparatus, (a) content request information which includes location information indicative of where the content managed by the administrative server is located and which is for requesting the administrative server to transmit the content, (b) identification information for identifying the portable communication apparatus or an owner of the portable communication apparatus, and (c) transmission time point information indicative of a point of time when the portable communication apparatus has transmitted the content request information; and first transmitting means for transmitting, to the administrative server, the content request information, the identification information, and the transmission time point information by establishing a connection to the administrative server based on the content request information received by the first receiving means. Further, the portable communication apparatus included in the content distribution system of the present invention is a portable communication apparatus whose identification information is registered in an administrative serve that administrates a content so that the administrative server identifies that the portable communication apparatus or an owner of the portable communication apparatus is permitted to use the content, and the portable communication apparatus includes: acquisition means for acquiring content request information for requesting the administrative server to transmit the content; an identification information storage device in which the identification information is stored; a clock section for measuring a transmission time point that is a point of time at which to transmit the content request information acquired by the acquisition means, to a reproducing apparatus for reproducing the content; transmission data forming means for forming transmission data to be transmitted to the reproducing apparatus, based on the content request information acquired by the acquisition means, the identification information stored in the identification information storage device, and transmission time point information indicative of the transmission time point measured by the clock section; and second transmitting means for transmitting, to the reproducing apparatus, the transmission data formed by the transmission data forming means. Furthermore, the administrative server included in the content distribution system of the present invention is an administrative server that manages a content, and includes: an identification information storage device in which to store identification information for identifying whether or not a portable communication apparatus or an owner of the portable communication apparatus is permitted to use the content; a second clock section for measuring reception time point information indicative of a point of time when the administrative server has received, from a reproducing apparatus for reproducing the content, (a) content request information for requesting transmission of the content, (b) identification information, and (c) transmission time point information indicative of a point of time when the portable communication apparatus has transmitted the content request information to the reproducing apparatus, in a case where the administrative server receives these pieces of information from the reproducing apparatus; judging means for judging authenticity of the content request information thus received, based on the identification information thus received and a difference between the transmission time point information and the reception time point information; and transmission determining means for determining a content to be transmitted to the reproducing apparatus, when the judging means judges that the content request information thus received is authentic, the judging means judging that the content request information thus received is authentic, when it is verified that the identification information thus received has been already stored in the identification information storage apparatus and the difference between the transmission time point information and the reception time point information is within a predetermined range.

Accordingly, the above arrangement of the content distribution system of the present invention yield such an advantageous effect that in a case where the reproducing apparatus transmits, to the administrative server, content request information received from the portable communication apparatus, the administrative server judges authenticity of the content request information and thereby can verify whether or not the reproducing apparatus is an authentic destination to which the content is to be provided.

Finally, the functional blocks of the portable communication apparatus 1, the functional blocks of the reproducing apparatus 2, and the functional blocks of the service-providing server 3 may be realized by way of hardware or software as executed by a CPU as follows.

The portable communication apparatus 1, the reproducing apparatus 2, and the service-providing server 3 each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the portable communication apparatus 1, the reproducing apparatus 2, and the service-providing server 3 a computer-readable storage medium containing control program code (executable program, intermediate code program, or source program) for the portable communication apparatus 1, the reproducing apparatus 2, and the service-providing server 3, which is software realizing the aforementioned functions, in order for the computer (or CPU, MPU) to retrieve and execute the program code contained in the storage medium.

Further, the portable communication apparatus 1, the reproducing apparatus 2, and the service-providing server 3 may be arranged such that the program code may be delivered over the communications network. The present invention encompasses in the form of transmission of a computer data signal embedded into a carrier wave, in which transmission the program code is embodied electronically.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The information distribution system 100 according to the present embodiment is a system in which, in one-way communication from the reproducing apparatus 2 to the service-providing server 3, the service-providing server 3 can verify whether or not the reproducing apparatus 2 is a destination to which a service is to be provided. The system can be widely applied to such a case where information or the like necessary for a service-providing server to perform verification cannot be supplied, like the reproducing apparatus 2 according to the present embodiment.

The invention claimed is:

1. A portable communication apparatus that is permitted to receive a service from a service-providing server for providing the service, in which service-providing server identification information assigned to the portable communication apparatus or an owner of the portable communication apparatus is registered as information for identifying a portable communication apparatus that is permitted to use the service provided from the service-providing server or an owner of the portable communication apparatus who is permitted to use the service provided from the service-providing server, said portable communication apparatus comprising:
a display section;
an operation section;
acquisition section for acquiring service-use information for requesting the service-providing server to provide the service;
an identification information storage device in which the identification information is stored;
a first clock section for measuring transmission time point that is a point of time at which to transmit the service-use information acquired by the acquisition means, to a service-using apparatus for using the service provided from the service-providing server, by establishing a connection to the service-providing server;
transmission data forming section for forming transmission image data to be transmitted to the service-using apparatus, by embedding, into image data, the service-use information acquired by the acquisition means, the identification information stored in the identification information storage device, and transmission time point information indicative of the transmission time point measured by the first clock section; and
second transmitting section for transmitting, to the service-using apparatus, the transmission image data thus formed by the transmission data forming means.

2. The portable communication apparatus as set forth in claim 1, wherein:
the image data includes an image region in which to store, in a compressed manner, an image to be displayed, and an information storage region in which to store information related to the image stored in the image region,
the transmission data forming section is configured to store, into the information storage region, the service-use information, the identification information, and the transmission time point information, so as to form the transmission image data.

3. The portable communication apparatus as set forth in claim 1, wherein:
the transmission data forming section is configured to form the transmission image data by attaching to the identification information and the transmission time point information signature information that ensures authenticity of the identification information and the transmission time point information.

* * * * *